(12) United States Patent
Fleeter et al.

(10) Patent No.: US 6,396,819 B1
(45) Date of Patent: May 28, 2002

(54) LOW-COST SATELLITE COMMUNICATION SYSTEM

(76) Inventors: Richard D. Fleeter, 11573 Greenwich Point, Reston, VA (US) 20194; John Eric Hanson, 345 Nita Ave., Mountain View, CA (US) 94043; Scott A. McDermott, 10439 Rapidan Ln., Manassas, VA (US) 20109-6450; Raymond G. Zenick, Jr., 440 S. Nardo Ave., Solana Beach, CA (US) 92075

( * ) Notice: Subject to any disclaimer, the term of this patent is extended or adjusted under 35 U.S.C. 154(b) by 0 days.

(21) Appl. No.: 09/045,970

(22) Filed: Mar. 21, 1998

(51) Int. Cl.[7] .............................................. H04B 7/216
(52) U.S. Cl. ...................................... 370/320; 370/342
(58) Field of Search ................................. 370/315, 316, 370/318, 319, 320, 325, 335, 342; 455/11.1, 12.1, 13.3, 15, 25, 403, 422, 427, 431, 500, 506, 516; 342/357.11, 430, 457, 354, 359, 367

(56) References Cited

U.S. PATENT DOCUMENTS

| | | | | |
|---|---|---|---|---|
| 4,901,307 A | * | 2/1990 | Gilhousen et al. | 370/320 |
| 5,109,390 A | * | 4/1992 | Gilhousen et al. | 370/335 |
| 5,537,397 A | | 7/1996 | Abramson | 370/18 |
| 5,566,168 A | * | 10/1996 | Dent | 370/323 |
| 5,668,556 A | * | 9/1997 | Rouffet et al. | 342/354 |
| 5,697,050 A | * | 12/1997 | Wiedeman | 455/12.1 |
| 5,758,260 A | * | 5/1998 | Wiedeman | 455/12.1 |
| 5,790,070 A | * | 8/1998 | Natarajan et al. | 342/354 |
| 6,128,469 A | * | 10/2000 | Zenick, Jr. et al. | 455/12.1 |

* cited by examiner

*Primary Examiner*—Kwang B. Yao
(74) *Attorney, Agent, or Firm*—Robert M. McDermott

(57) ABSTRACT

The satellite communication system has a ground station and multiple remote terminal units (RTUs). The RTUs are designed to infrequently transmit relatively short duration messages, and to repeatedly transmit the same message, so that it is received by a sweeping high gain satellite antenna. To minimize costs, the system is designed to allow the use of RTUs that use a fixed modulation scheme. Because the transmissions are infrequent and short, the loss of messages due to collisions is unlikely. As a further optimization, the RTUs have CDMA transmitters that each use the same CDMA code, and the ground station has multiple CDMA correlators using the same CDMA code. By using the same CDMA code, the loss of messages due to collisions is further reduced. For transmitting to the RTUs, the ground station has multiple CDMA modulators, each using a second CDMA code that is preferably orthogonal to the first CDMA code.

37 Claims, 19 Drawing Sheets

LOW-COST SATELLITE COMMUNICATION SYSTEM

FIELD OF THE INVENTION

This invention relates generally to satellite communication systems, and in particular to a communication system for transmitting short duration messages from low-cost remote terminal units dispersed over a wide geographic area.

BACKGROUND OF THE INVENTION

There is a growing need for receiving information from sources that are dispersed about a wide area. For example, for efficient farming and irrigation, knowledge of soil moisture content at various locations across a field or region is important; for efficient shipping and navigation, knowledge of sea conditions at various locations across an ocean is important. Similarly, there is a growing need for the control of devices that are dispersed about a wide area, such as switches that open or close irrigation flues. There is also a growing need for receiving information about the location of resources that may travel about a wide area. For example, for efficient wildlife or herd management, knowledge of the location of members of the herd is important; for property recovery, the knowledge of the location of a stolen vehicle is important. Such information and control messages are characterized as being of relatively short duration, and/or not necessarily time-critical. The information content of a particular message may also be relatively insignificant, but the aggregate information content from a plurality of remote sensors, such as barometric sensors, may have significance. However, because these control devices and information sources are dispersed over a large area, the communication of these relatively short and somewhat non-critical messages is often cost prohibitive using conventional communication systems. The use of relatively complex devices, such as cellular telephones or pagers, to communicate the messages also make the collection or distribution of these messages cost prohibitive.

Satellites offer the possibility of providing communications to and from remote terminal units over a wide service area, without the infrastructure typically required for ground-based communications systems. Because of the desire to keep the complexity of each satellite to a minimum, satellites also provide the opportunity to provide communication services customized to an anticipated type of information transfer. That is, a satellite communication system optimized for a particular type of message transfer, such as a high-volume of low-priority short-messages, will be significantly less complex, and therefore more inherently reliable and less costly than conventional systems designed for high-priority continuous information transfer.

To communicate via a satellite, the transmitted signal from a ground station must be received at the satellite at a sufficient signal to noise ratio (SNR), and the retransmitted signal from the satellite must be also be received at the intended ground station at a sufficient SNR. The SNR can be increased by increasing the power density of the signal being received, or by reducing the power density of the noise being rreceived. To optimize the received power density, directional antennas are used to narrow the transmission beamwidth, thereby increasing the portion of the transmitted power being received by the receiver by minimizing the dispersion of the transmitted power. Because the transmitted power density within a narrow-beamwidth antenna's beamwidth is increased, as compared to the transmitted power density from an omnidirectional antenna, a narrow-beamwidth antenna is termed a high-gain antenna; a wide-beamwidth antenna is termed a low-gain antenna. Directional, high-gain antennas are used to narrow the receiver beamwidth, to decrease the portion of noise energy being received. Directional high-gain antennas must be aimed so that the intended receiver antenna or transmitter antenna is contained within the narrowed beamwidth. The narrower the beamwidth, the more precise the aiming must be. The area encompassed by an antenna's beamwidth is termed the antenna's field of view.

To minimize the number of satellites needed to provide communications over a wide geographic area, each satellite should have an antenna with a field of view that covers a maximum amount of the satellite's service area. That is, each satellite should have a relatively low-gain wide-beamwidth antenna. To provide a high signal to noise ratio for communications to and from the satellite, the ground station uses high-gain narrow-beamwidth antenna, to compensate for the satellite's low-gain antenna. Satellites that broadcast television signals, for example, utilize a relatively wide-beamwidth antenna covering their entire service area, and each television receiver requires a high-gain narrow-beamwidth antenna that is aimed at the transmitting satellite.

The requirement to aim a directional high-gain antenna at a satellite is infeasible or impractical for mobile ground terminals, or for moving satellites. This requirement also increases the cost of the ground terminals, making their use for relatively infrequent and low-priority messages cost prohibitive. The aforementioned satellite television broadcast system uses geo-stationary satellites, and is intended for fixed reception sites. Geo-stationary satellites are significantly more expensive to launch and maintain than lower altitude satellites, and, being farther from the earth, require more transmitted power or higher-gain antennas. A typical solution for mobile ground terminals and moving satellites is to use a narrow-beam high-gain antenna at the satellite, and allow wide-beam antennas at the ground terminals. The use of narrow-beam antennas, however, requires a significant increase in the number of satellites needed to provide communications over a large geographic area, because each antenna's field of view is significantly smaller than the satellite's service area, and overlapping satellite service areas are required to provide sufficient fields of view that cover the geographic area. As with ground communications systems, however, providing a significant number of satellites to a sparsely populated geographic area may not be economically feasible, and the cost of providing such a service to an economically disadvantaged region may preclude its use. Furthermore, in populated areas, the profusion of mobile telephony and high speed data transfer communications imposes significantly complex design requirements on all transmitters, such that the cost of using existing systems for the transmission of relatively short bursts of information or control messages is not justified.

Therefore, a need exists for a satellite communications system for transmitting information messages of relatively short duration from remote terminal units dispersed over a wide geographic area that utilizes a minimum number of satellites yet allows for the use of a wide-beamwidth antenna at the remote device. There is also a corresponding need for transmitting relative short duration control information to remote terminal units using a minimum number of satellites and a low-gain wide-beamwidth antenna at the remote device. The remote devices should also require minimal power, allowing for their use as portable or mobile devices, and should be of minimal cost and complexity, allowing for their use in a wide variety of multi-point data collection activities.

DETAILED DESCRIPTION OF THE INVENTION

In general, the satellite communications system of this invention provides high-gain coverage to a wide geographic area with a minimum number of satellites, and allows for the use of inexpensive remote terminal units for communicating with the satellite. A satellite in accordance with this invention includes a high-gain antenna that periodically sweeps the satellite's service area to receive the messages from remote terminal units within the entire service area. Because the highgain antenna sweeps the satellite's entire service area, there is no need to deploy multiple satellites with overlapping service areas. In order to provide high gain, the antenna is designed to have a narrow beamwidth in at least one dimension. To cover the entire area, the antenna's field of view is swept across the entire service area. In the preferred embodiment, the antenna's field of view is essentially rectilinear, having a narrow beamwidth in one dimension and a beamwidth that extends across the entire service area in the other dimension, such that the sweeping effect is akin to that of a common push-broom. Because of the high gain of the satellite antenna, communications via the satellite can be accomplished using low power and/or using a low-gain wide-beamwidth antenna at the remote terminal unit. The system is optimized for the use of remote terminal units that transmit short duration messages relatively infrequently. To provide cost-effectiveness, the preferred remote terminal units have minimal capabilities, having for example a fixed transmit frequency or a fixed modulation scheme. Because the messages are infrequent and short, the same communication channel may be shared among multiple remote terminal units, allowing for the mass production of virtually identical low-cost, single-purpose transmitters.

For convenience in terminology, the satellite communications system will be described herein as including remote terminal units (RTUs) and a ground station. The RTUs are the satellite communication devices that operate at low power and/or with low-gain antennas. The remote terminal units may include a transmitter, a receiver, or both. The RTU transmitter is constrained to be low powered, either to allow for sustained portable operation, or because of regulatory constraints, such as FCC limits. Although one ground station is used in the examples herein, the principles presented can be readily applied to multiple ground stations. The ground station may operate at high power and/or with a high-gain antenna and satellite tracking capability. However, as would be evident to one of ordinary skill in the art, the ground station may also operate at low power and/or with a low-gain antenna, and may in fact be similar in structure and design as the remote terminal units. Similarly, some remote terminal units may be located at sites providing virtually unlimited power, and/or at fixed sites that allows for the use of a higher-gain antenna.

Figure 1:
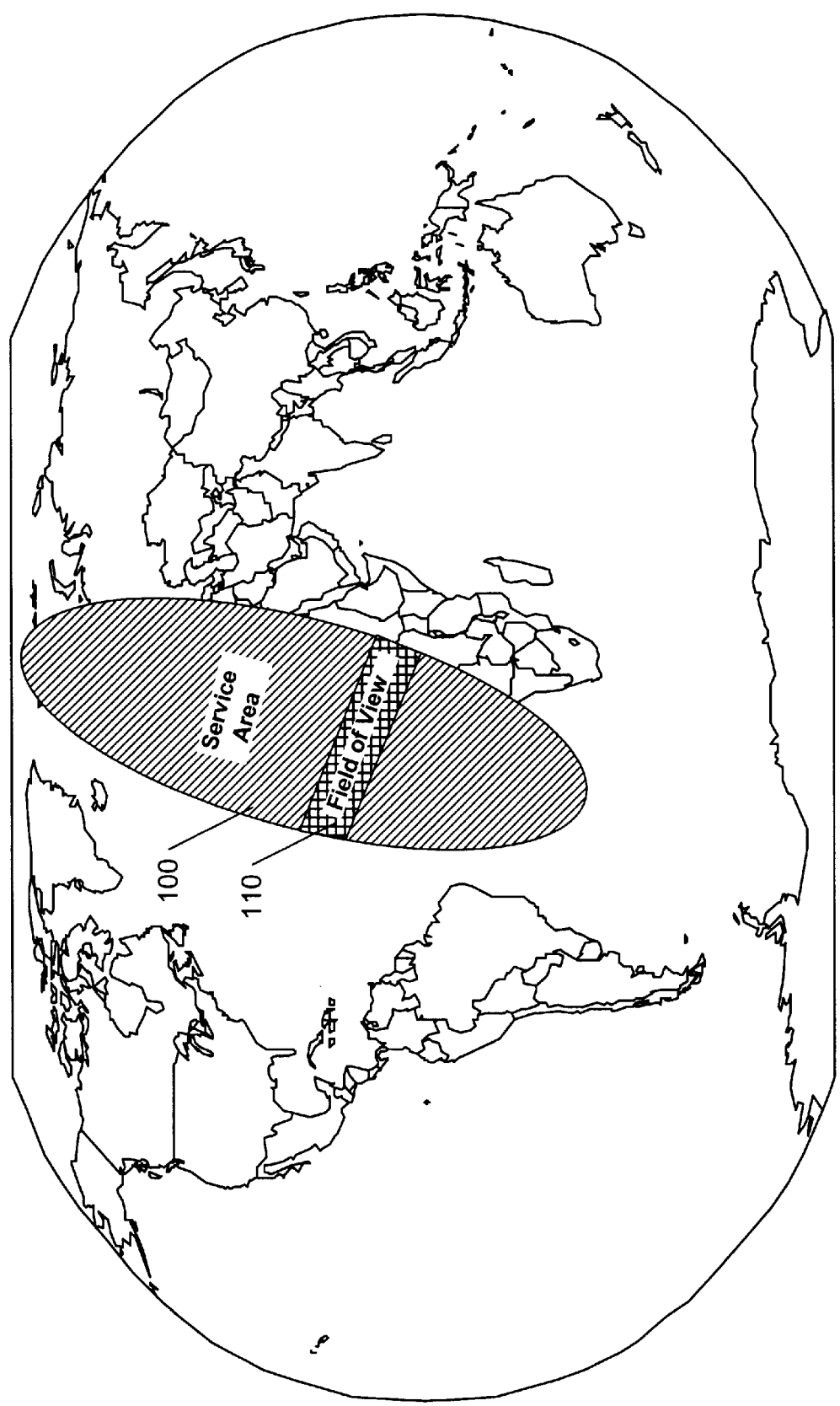
FIG. 1 illustrates a satellite service area and a field of view of a high gain antenna in accordance with an aspect of this invention.

FIG. 1 shows a map of the earth with a satellite service area 100 overlaid upon a portion of the earth's surface. The service area 100 is the area on the earth's surface to and from which effective communications with the satellite can be maintained. The service area 100 of a satellite is determined primarily by the satellites altitude above the earth, and the minimum elevation angle from the earth to the satellite for effective communications. Although a satellite's service area 100 may theoretically extend to an entire hemisphere, communications to and from regions on the fringe of the theoretical extent exhibit a significant amount of ground based interference, because signals travelling at a low elevation angle must traverse a longer distance over the earth's surface. In general, an elevation angle of at least 30 degrees is preferred. For a "low-earth" (LEO) satellite, the service area 100 is about +/−30 degrees longitude and latitude. As the satellite moves relative to the earth's surface, the satellite's service area moves as well.

FIG. 1 also shows a field of view 110 representative of an embodiment of a high gain antenna in accordance with this invention. As shown, the field of view 110 is substantially smaller than the satellite's service area. The size of the field of view 110 and the antenna gain are directly related. An antenna having a gain of ten over an antenna that encompasses the entire service area 100 will have a field of view 110 of one-tenth the area of the service area 100. In the preferred embodiment, the antenna's field of view 110 is essentially rectilinear and extends across the service area 100 in one dimension, although other configurations would be evident to one of ordinary skill in the art.

Figure 2:
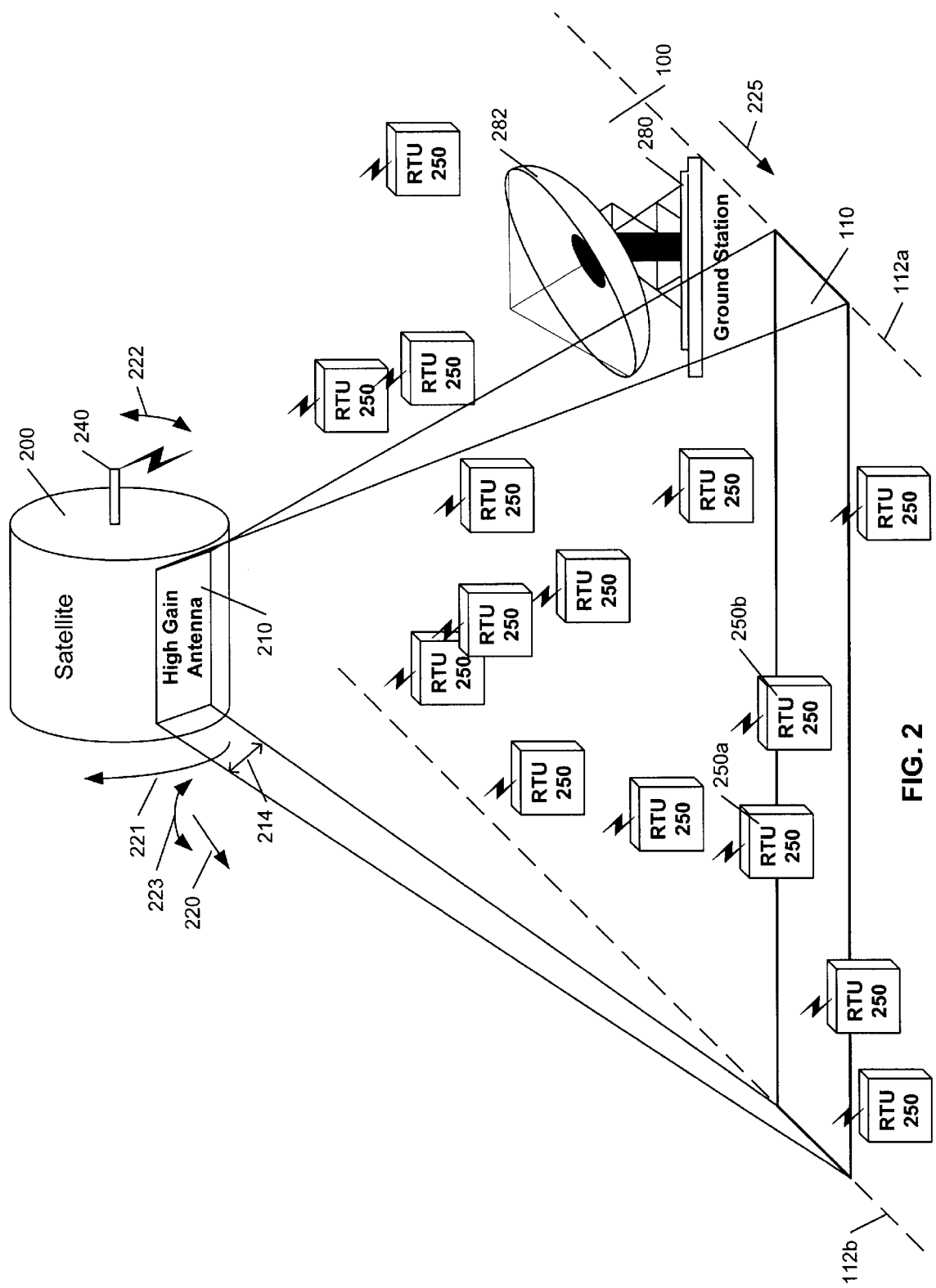
FIG. 2 illustrates an embodiment of a satellite communications system in accordance with an aspect of this invention.

FIG. 2 shows an illustration of a satellite 200 having a high-gain antenna 210 that has a field of view 110 within the satellite's service area 100. The dashed lines 112a and 112b indicate the bounds of the service area 100, formed by the sweeping of the field of view in the direction indicated by the arrow 225. The field of view 110 can be made to sweep the service area 100 in a variety of manners. The preferred embodiment uses satellites that travel in an orbital plane. As the satellite 200 traverses the sky above the service area 100 in the direction indicated by the arrow 220, the field of view 110 will traverse the path 112a–b. Additionally, to sweep the service area more often than once per orbital period, the satellite 200 and antenna 210 may be rotating, as shown by arrow 221, or rocking back and forth, as shown by arrows 222 and 223. Other means of having the field of view 110 sweep the service area 100 would be evident to one of ordinary skill in the art. The high-gain antenna 210 can be fixedly mounted to the satellite 200, or movably mounted; for ease of discussion, a movement of the satellite 200 implies a corresponding movement of the field of view 110 of the antenna 210, although an independent movement of the antenna 210 may be used to effect the same result. For example, the antenna 210 can be mounted as a pendulum, thereby providing the rocking motions 222 and 223 with minimal energy demands to sustain the motion. Each of the means of sweeping the service area 100 can be used independently or in conjunction with each other to effect the sweep. For example, the satellite could be travelling in direction 220 and rotating 221 at the same time. If the service area 100 is both wider and longer than the field of view, the field of view 110 may be swept across the service area in two dimensions, for example by travelling in direction 220 while rocking about an axis coincident with the direction of travel 220, as shown by arrow 223.

Also shown in FIG. 2 are a plurality of remote terminal units RTU 250, and a ground station 280. The RTUs 250a and 250b are shown to be within the field of view 110 of the high gain antenna 210, whereas the other RTUs 250 are outside the field of view 110. The RTUs 250a and 250b are the only RTUs 250 that are able to communicate with the satellite 200 via the antenna 210, because of the antenna's narrow beamwidth 214. Because the antenna's beamwidth is narrow, its gain is high, thereby allowing the use of a low powered transmitter and low gain antenna at the RTUs 250a and 250b within its field of view 110. The required gain of the antenna 210 is determined based upon the transmitted power of the RTUs 250a–b, the distance of the satellite 200 from the RTUs 250a–b, the gain, if any, of the antennas at the RTUs, and the predicted noise level, using conventional "link-margin" calculations common to one of ordinary skill in the art. The required gain of the antenna 210 thereafter determines the total beamwidth of the antenna 210, from which the beamwidths in each dimension can be chosen. In a typical configuration, the RTUs 250 are limited to be one-watt transmitters with omnidirectional or hemispherical antenna patterns, with a gain of 0 to 5dBi, where dBi is the gain relative to an isotropic antenna. To receive the signal with a sufficient SNR at a satellite receiver located 2500 km above the earth, the antenna gain should be at least 14 dBi. An antenna having a total beamwidth of 10 degrees by 90 degrees will provide a gain of approximately 14 dBi. This link margin analysis is based on a 1200 baud signal at a worse case slant range at 10 degrees of elevation, and a corresponding transmitter to satellite distance of 8152 km. As would be evident to one of ordinary skill in the art, increasing or decreasing the transmission data rate will correspondingly increase or decrease the required gain.

By sweeping the service area 100 with the field of view 110 of the high-gain antenna 210, each of the RTUs 250 will be within the field of view 110 at some time, and will thus be able to transmit to the satellite using a low powered transmitter and a low gain antenna. In a similar manner, whenever an RTU 250 is within the field of view 110 of the high-gain antenna 210, it will be able to receive communications from the satellite 200 using a low gain antenna. To provide at least a 2:1 gain at the high-gain antenna 210 compared to an antenna having a field of view equal to the satellite service area 100, the field of view 110 should be less than half the service area 100. As the field of view 110 is reduced relative to the service area, the transmit power and antenna gain requirements at the RTU 250 decrease.

Figure 3:
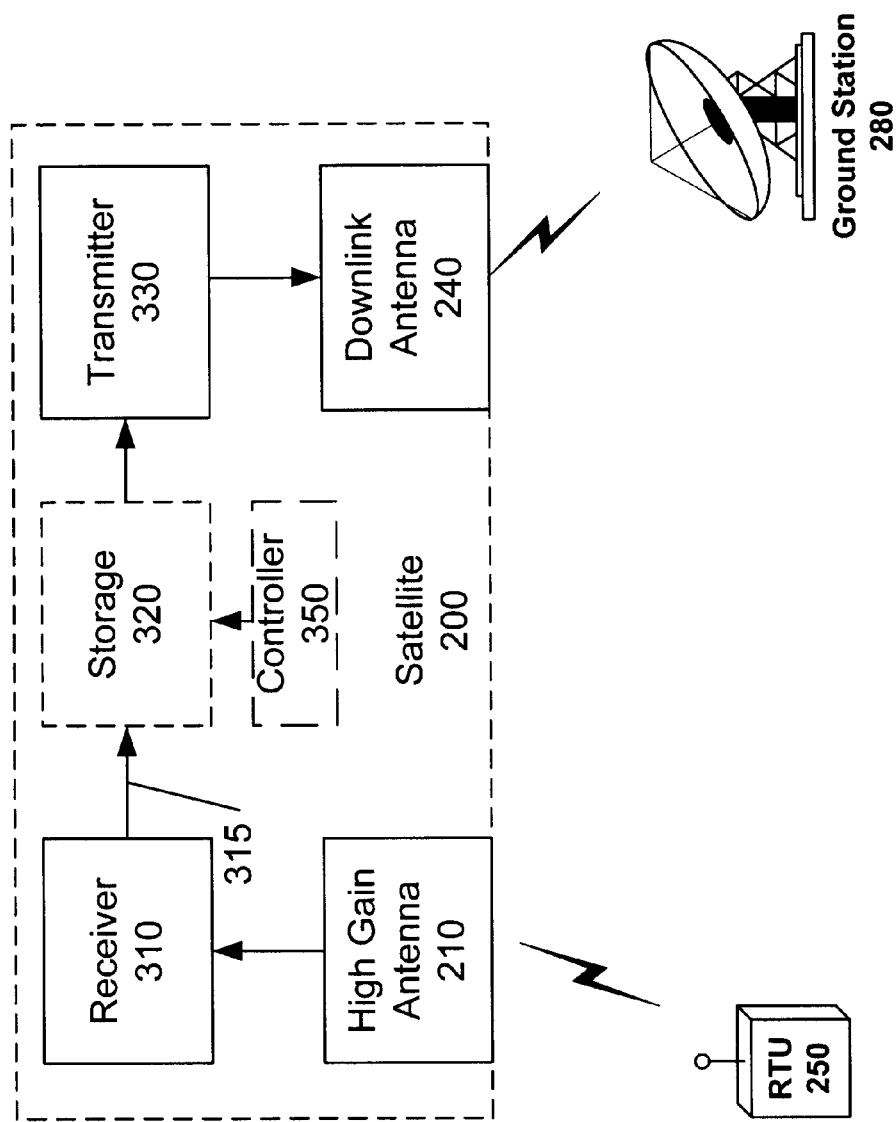
FIG. 3 illustrates a block diagram of an embodiment of a satellite communications system in accordance with an aspect of this invention.
Figure 4:
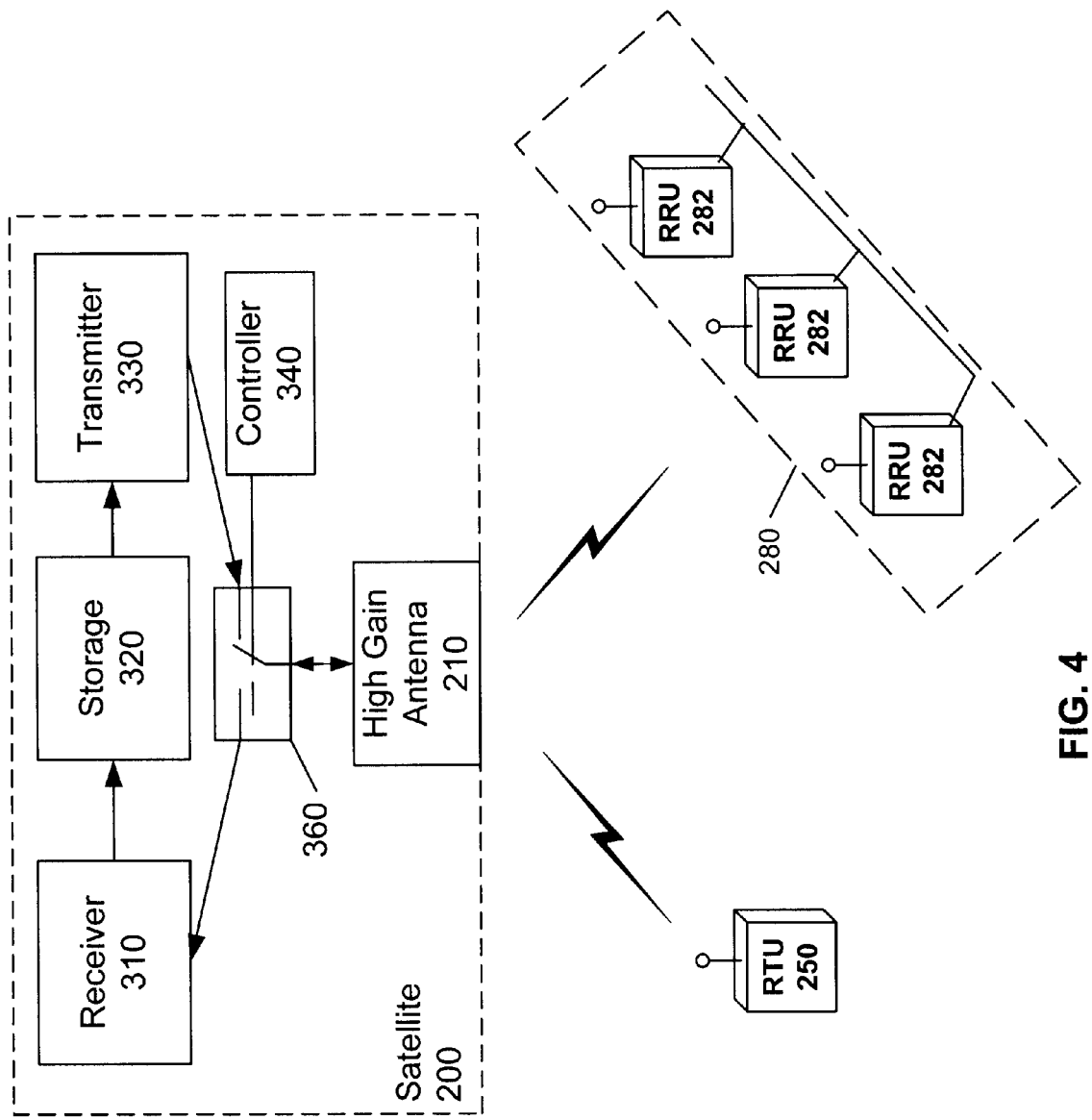
FIG. 4 illustrates a block diagram of an alternative embodiment of a satellite communications system in accordance with an aspect of this invention.

The ground station 280 is shown having a directional high-gain antenna 282. Because the ground station uses a high-gain antenna 282, the satellite is able to use a wide-beamwidth low-gain antenna 240 for communications with the ground station 280. By using a wide-beamwidth antenna 240 for communicating with the ground station 280, the ground station 280 can communicate with the satellite independent of the field of view 210 of the high-gain antenna 210. That is, the ground station 280 can be anywhere within the field of view of the wide-beamwidth antenna 240. As in a conventional satellite system, the satellite is designed with minimal transmit power requirements. Link-margin calculations determine the required gain of the ground station antenna 282 to allow for the minimal satellite requirements, balanced against the cost of providing the accurate satellite tracking required for a high-gain antenna. Alternatively, if the satellite 200 uses the same high-gain antenna 210 to communicate with the ground station 280, the ground station 280 need not use a high-gain antenna that requires satellite tracking. FIG. 3 and FIG. 4 shows two embodiments of a satellite 200 for communicating information from RTUs 250 to a ground station 280.

In FIG. 3, the receiver 310 receives communications from the RTUs 250 via the high gain antenna 210. Optionally, as discussed below, the received communications 315 may be temporarily stored in storage 320, under the control of a controller 350. The received transmissions 315 are transmitted to the ground station 280 by the transmitter 330 via the downlink antenna 240. The ground station can be located anywhere within the field of view of the downlink antenna 240 to receive communications from the RTUs 250 within the field of view 110 of the high-gain antenna 210. Thus, if the field of view of the downlink antenna 240 includes the entire service area 100, the storage 320 for the received transmissions 315 is not required, because the ground station 280 can receive the communications as they are being transmitted from the RTUs 250. This combination of a receiver 210 and transmitter 230, without intermediate storage, is conventionally referred to as a transparent transponder. The transparent transponder configuration is preferred, as it obviates the need for storage 320 and controller 350 within the satellite 200.

Figure 5:
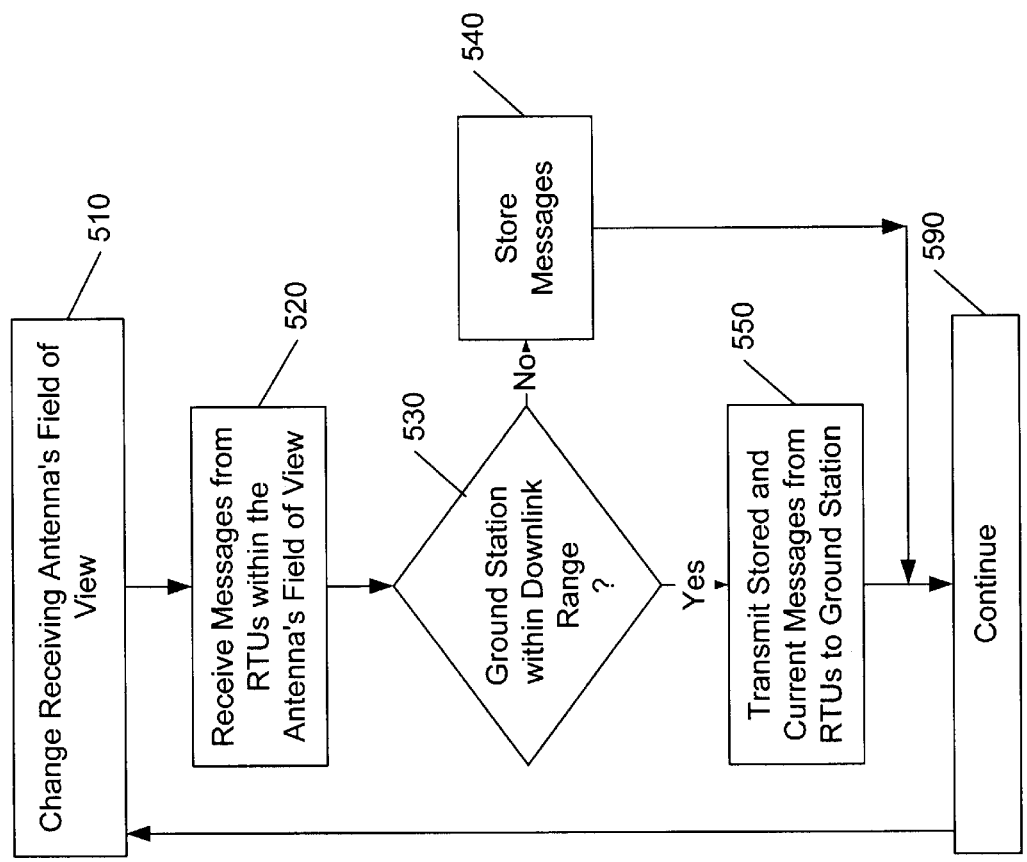
FIG. 5 illustrates a flow chart of an embodiment of a satellite communications system in accordance with an aspect of this invention.

If the field of view of the downlink antenna 240 excludes the ground station 280 during any period of time that the field of view of the high-gain antenna 210 is within the service area 100, the received messages 315 will be lost, unless the satellite 200 contains the optional storage 320. In this case, the controller 350 stores the received transmissions 315 in storage 320 for subsequent transmission to the ground station 280 when it is again within the field of view of the downlink antenna 240. FIG. 5 shows a flowchart for an embodiment of a controller 350 to effect this control. The loop 510–590 represents the continuing change of the field of view 110 of the high gain antenna 210 as it sweeps the service area 100. The receiver 310 receives the messages from each of the RTUs within the field of view 110, at 520. If, at 530, the ground station is within the range of the downlink antenna 240, the messages are transmitted directly to the ground station 280, at 550. The term range is used in 530 to indicate that the ground station 280 must be within the field of view of the antenna 240, and must provide a sufficient SNR to assure reliable communications. As discussed above, the SNR is a function of the distance of the ground station 280 from the satellite 200, the amount of received noise, and the effective gain of the ground station antenna 282. The effective gain of the ground station antenna 282 is also a function of the ability of the ground station 280 to accurately aim the antenna 282 at the satellite 200. Conventionally, the ground station 280 communicates a measure of the received SNR to the satellite 200, for example, a "locked-on" signal, for the controller 350 to make the determination at step 530 in FIG. 5. If the ground station 280 is not within range of the downlink antenna 250, the received messages are stored in the storage 320, at 540. When the ground station is next within range of the downlink antenna 240, the stored messages are transmitted along with the current messages, at 550.

In FIG. 4, the same high gain antenna 210 is shown for both transmit and receive functions. In this embodiment, the controller 340 controls the storage of received messages, similar to controller 350 in FIG. 3, and also controls a switcher 360. The switcher 360 switches the connection of the high gain antenna 210 to either the receiver 310 or the transmitter 330. This configuration allows the use of low-gain antennas at the RTUs 250 and at the ground station 280. The configuration of FIG. 4 is well suited for a "distributed ground station" 280. A distributed ground station 280 uses a plurality of remote receiver units 282, dispersed about the service area 100, and interconnected via an alternative communication means, such as land lines. Such a distributed ground station 280 may be utilized, for example, along a coastline at the edge of an oceanic service area 100. The controller 340 uses a conventional time-slice algorithm for controlling the switcher 360, although an on-demand algorithm could be used as well; such switching techniques, and others, are common to one of ordinary skill in the art.

FIGS. 3–5 have illustrated embodiments of the invention for the receipt of messages from the RTUs 250 for transmission to the ground station 280; as would be evident to one of ordinary skill in the art, the principles presented herein can be applied for the receipt of messages from the ground station 280 for transmission to the RTUs 250. Note, however, that such a complementary configuration requires that the transmission to a particular RTU 250 must occur while this particular RTU 250 is within the field of view 110 of the high-gain antenna 210.

Figure 6:
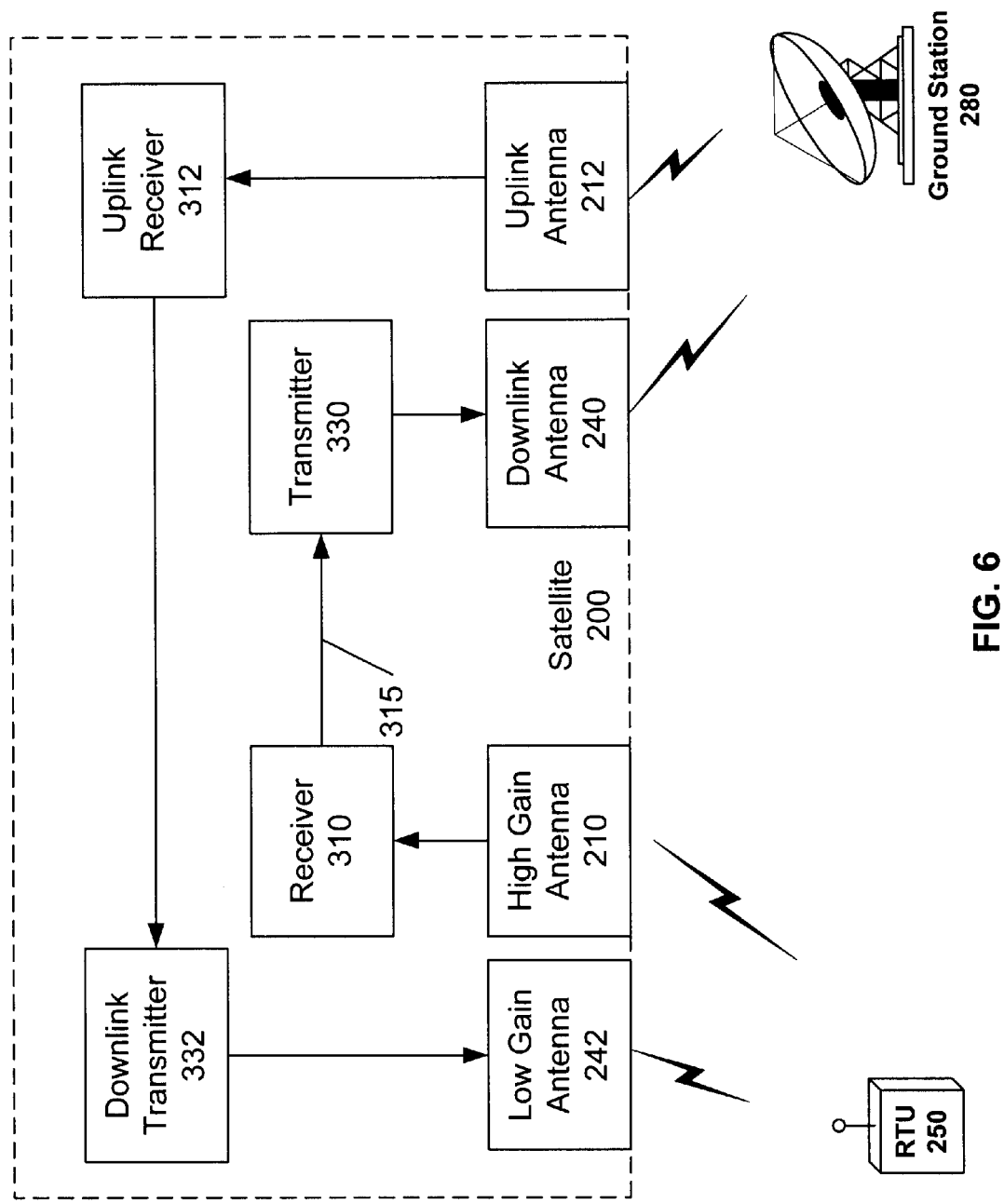
FIG. 6 illustrates a block diagram of a third embodiment of a satellite communications system in accordance with an aspect of this invention.

FIG. 6 illustrates an alternative embodiment of a satellite communications system wherein the satellite 200 contains two independent communication paths between the ground station 280 and the RTUs 250. The first path, from the RTUs 250 to the ground station 280 is via the high gain antenna 210, the receiver 310, the transmitter 330, and the downlink antenna 240, as discussed with regard to FIG. 3. The second path, from the ground station 280 to the RTUs 250 is via an uplink antenna 212, an uplink receiver 312, a downlink transmitter 332, and a wide-beamwidth antenna 242.

As discussed above, the RTUs 250 are constrained in transmit power by the requirement to be portable and/or remote, and often by regulatory constraints, such as FCC limits. The satellite 200 is not necessarily similarly constrained. In the alternative embodiment of FIG. 6, the satellite 200 uses a wide-beamwidth antenna 242 to transmit to the RTUs 250. By using a wide-beamwidth antenna 242, all the receiving RTUs 250 within the beamwidth of the wide-beamwidth antenna 242 can receive communications from the ground station 280, independent of the field of view 110 of the high-gain antenna 210. Because the wide-beamwidth antenna 242 has low-gain, and the receiving RTUs 250 have low-gain antennas, the downlink transmitter 332 must transmit sufficient power to assure a sufficient SNR at the receiving RTUs 250. As discussed above, the transmit power required will be determined by a link margin analysis, common to one of ordinary skill in the art. In one embodiment of FIG. 6, for a 1200 baud signal, a satellite 200 at a slant range of 8152 km from the RTUs 250, using RTUs 250 having 5 dBi antenna gain, the downlink transmitter 332 transmits 8 watts via a wide-beamwidth antenna 242 having a gain of 5 dBi; alternatively, a 1 watt transmitter could be used to transmit at 150 baud (one-eighth of 1200 baud).

Figure 7:
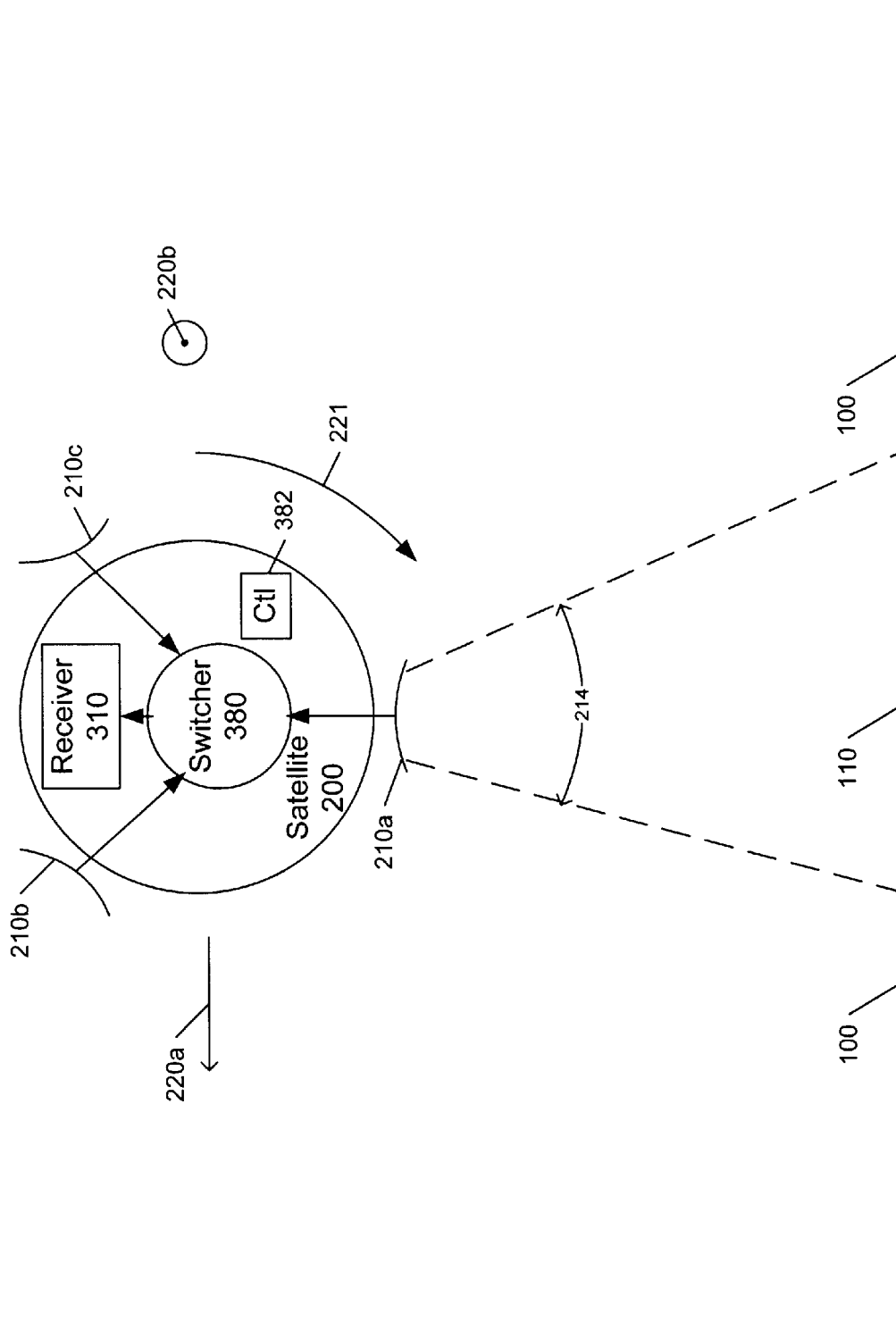
FIG. 7 illustrates a block diagram of an embodiment of a satellite having multiple high-gain antenna elements in accordance with an aspect of this invention.
Figure 8:
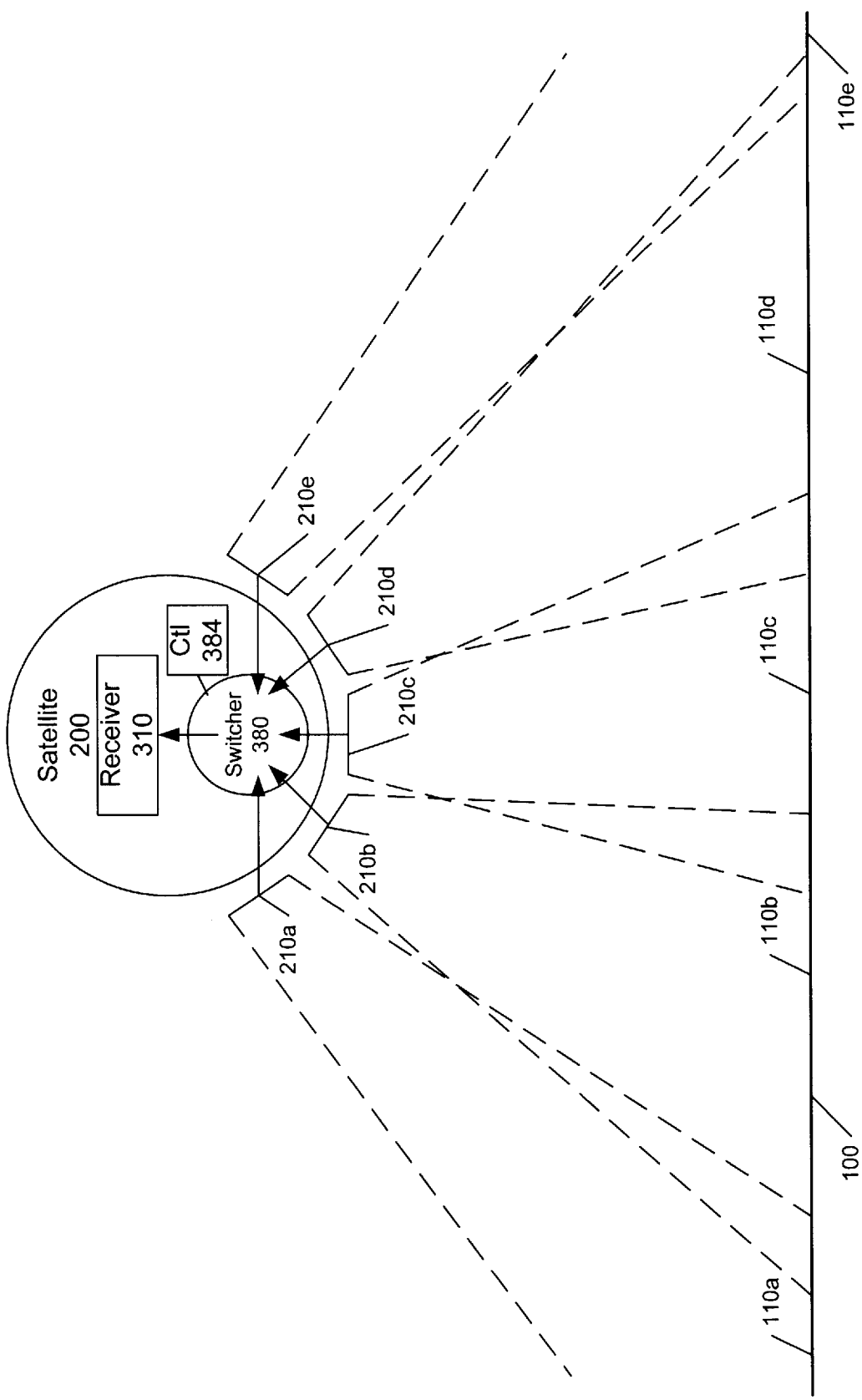
FIG. 8 illustrates a block diagram of another embodiment of a satellite having multiple high-gain antenna elements in accordance with an aspect of this invention.
Figure 9:
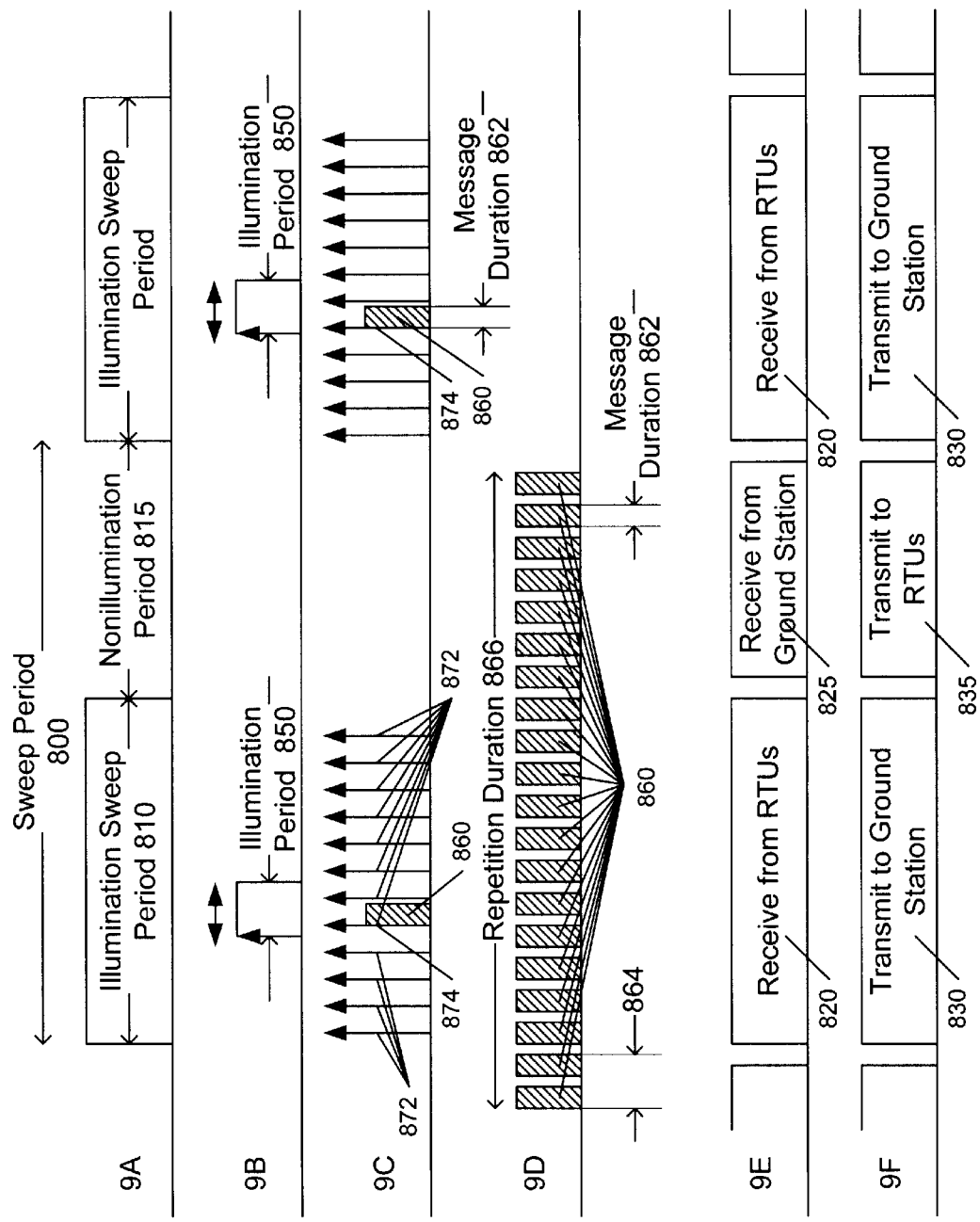
FIG. 9 illustrates a timing diagram of a satellite communications system in accordance with an aspect of this invention.

FIGS. 7, 8, and 9 show embodiments of alternative configurations of a satellite 200 for effecting a high-gain sweep of a service area 100. In FIG. 7, a satellite controller 382 effects a rotation of the satellite 200 in the direction 221. The satellite 200 is shown having three high-gain antenna elements 210a, 210b, and 210c. In synchronization with the rotation of the satellite 200, the satellite controller 382 controls a switcher 380 to sequentially connect the receiver 310 to each antenna element 210a, 210b, 210c, as each antenna element's field of view 110 enters the service area 100. As discussed above, this sweeping effect can be combined with other changes of location or orientation of the satellite 200 relative to the service area 100. For example, the satellite 200 may also be moving in the direction shown by arrow 220a, effectively moving the service area 100 in the direction 220a. Alternatively, the satellite may be moving perpendicular to the plane of FIG. 7, as indicated by the point of a direction vector 220b, such that the rotation in direction 221 effects a sweep across one dimension of the service area while the motion of the satellite 200 in the direction 220b effects the sweep in the other dimension of the service area.

FIG. 8 shows an embodiment of a satellite communications system that also uses a plurality of antenna elements 210a–210e and a switcher 380 to effect a sweep of a service area 100. In this embodiment, the satellite 200 maintains a relatively constant orientation with respect to the service area 100, and the extent of the individual fields of view 110a–110e of the high-gain antenna elements 210a–210e extend across the service area 100. A controller 384 alternately connects the receiver 310 to the antenna elements 210a–210e via the switcher 380. The selection may be round-robin: 210a, 210b, . . . 210e, 210a, . . . ; or back-and-forth: 210a, 210b, . . . 210e, 210d, 210c, . . . 210a, 210b, . . . to effect a sweep of the service area 100. It may also be demand driven, such that the fields of view 110a–110e that result in more messages from RTUs 250 than other fields of view 110a–110e are selected more often by the controller 384.

FIG. 9 shows the timing relationships introduced by the sweeping of a service area 100 by a high gain antenna 210. The time during which an RTU 250 is within the field of view 110 of the high-gain antenna 210 is termed the illumination period 850. The overall time during which the high-gain antenna 210 is sweeping the service area 100 is the illumination sweep period 810. The time duration between the start of each sweep is the sweep period 800, and the difference between the sweep period 800 and the illumination sweep period 810 is the nonillumination period 815.

Each RTU 250 has an illumination period 850 that is substantially less than the sweep period 800, and in particular, substantially less than the illumination sweep period 810. The ratio of an RTU's illumination period 850 and the illumination sweep period 810 is dependent upon the gain of the high-gain antenna 210, and, correspondingly, the size of the field of view 110 relative to the service area 100. As discussed above, the field of view 110 should be less than half the size of the service area 100. In a typical embodiment, the field of view 110 is less than a fifth of the service area 100, and thus, an RTU's illumination period 850 will be less than a fifth of the illumination sweep period 810. This provides a 5:1 improvement in antenna gain, compared to an antenna having a field of view equal to the service area 100. The location of the RTU illumination period 850 relative to the illumination sweep period is dependent upon the particular RTU's 250 location within the service area 100, relative to the sweep 225 of the field of view 110 of the high-gain antenna 210.

Figure 10:
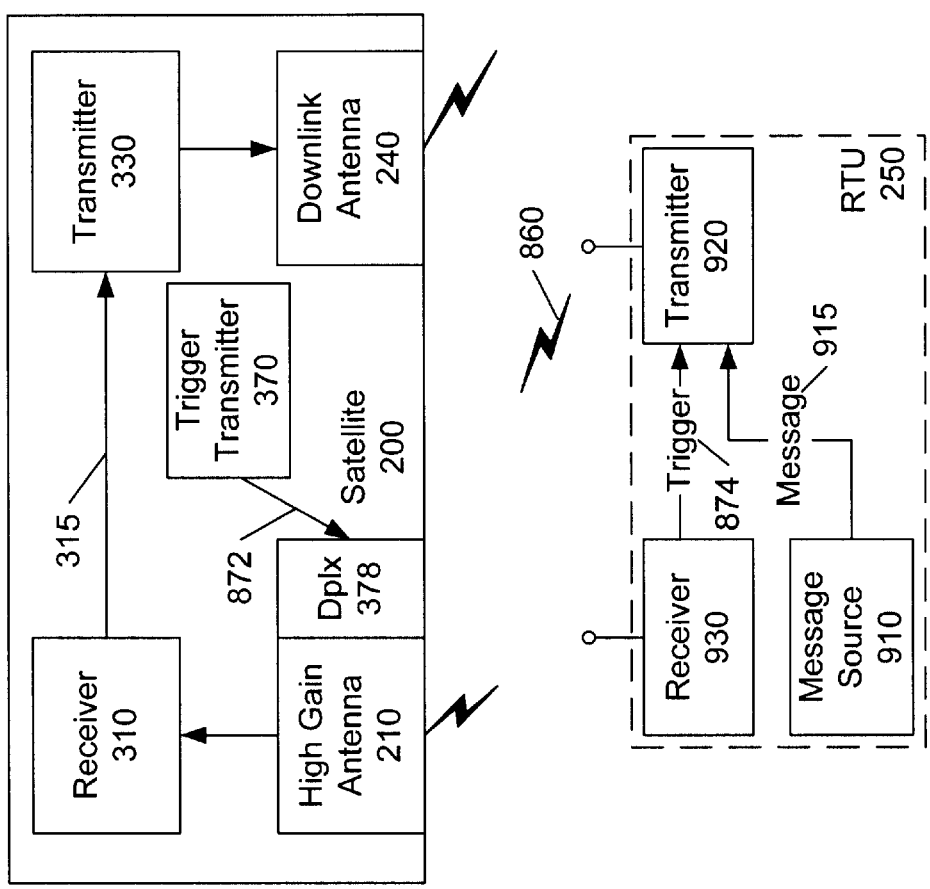
FIG. 10 illustrates a block diagram of an embodiment of a remote terminal unit and satellite communications system in accordance with an aspect of this invention.

Because an RTU 250 is not continually within the field of view 110 of the high-gain antenna 210, each RTU 250 must be designed so as to assure that the intended message is transmitted when the RTU 250 is illuminated 850 by the high gain antenna 210. FIG. 10 illustrates an embodiment of an RTU 250 that responds to trigger signals 872 transmitted from the satellite 200. The RTU 250 includes a message source 910, a receiver 930, and a transmitter 920. The message source 910 may be a transducer that is measuring some parameter, such as soil moisture content, or any other device that generates an information message 915 intended to be transmitted. Upon receiving a trigger signal 872, the receiver 930 issues a trigger pulse 874 to the transmitter 920. Upon receiving a trigger pulse 874 from the receiver 930, the transmitter receives the information message 915 from the message source 910, and transmits a corresponding transmission message 860. The satellite receiver 310 receives the transmission message 860 via the high gain antenna 210. In order for this system to operate properly, the transmission message 860 must be transmitted when the RTU 250 is within the field of view 110 of the high-gain antenna 210. As shown in FIG. 10, the satellite 200 includes a trigger transmitter 370 that transmits trigger signals 872 via the high-gain antenna 210. The antenna diplexor 378 decouples the receiver 310 from the high-gain antenna 210 during the brief periods of transmission of the trigger signals 872. Example trigger signals 872 are shown on line 9C of FIG. 9. Because these trigger signals 872 are transmitted via the high-gain antenna 210, the RTU 250 of FIG. 11 will not receive the trigger signals 872 until the RTU 250 is within the field of view 110, shown by the illumination period 850 in FIG. 9. The receiver 930 of the RTU 250 will produce the trigger pulse 874 corresponding to the first trigger signal 872 that occurs within the illumination period 850. As shown on line 9C, in response to this trigger pulse, the transmitter 920 transmits the transmission message 860 immediately after the first trigger signal 872 that occurs within the illumination period 850. Because the generation of the trigger pulse 874 cannot occur until the RTU 250 is within the field of view 110 of the high-gain antenna 210, and the transmission occurs immediately thereafter, the transmission message 860 will be received via the high-gain antenna 210. Note, however that the duration 862 of the transmission message 860 cannot exceed the illumination period, else the trailing end of the transmission message 860 will occur when the RTU 250 is no longer within the field of view 110 of the high-gain antenna 210. Also, because the trigger signal 872 is asynchronous with the illumination period of each particular RTU 250, the sum of the period of the trigger signals 872 and the message duration 862 must be less than the illumination period 850 in order to assure that the transmission message 860 is completed before the end of the illumination period 850.

To support the transmission of relatively long information messages, the transmitter 910 can be configured to partition the information message 915 into partial information messages, and transmit each of the partial information messages as a transmission message 860 having a message duration 862 that conforms to the above constraint, as discussed below with reference to FIG. 21. Also, the transmission of messages from an RTU 250 can be further optimized by checking each information message 915 with its immediately prior information message, and only transmitting a transmission message 860 when the there is a difference from one message to the next.

Note that the RTU 250 of FIG. 10 includes a receiver 930, and the satellite 200 includes a trigger transmitter 370 and diplexor 378. In addition to the additional cost introduced by these components, a failure in either of these components will preclude communications from the RTU 250, and a failure of the trigger transmitter 370 or diplexor 378 will preclude communications to the satellite 200 from all RTUs 250. The preferred embodiment of FIG. 11 shows an RTU 250 for use with a satellite 200 as shown in FIG. 3; that is, the preferred embodiment does not require the use of a trigger signal to effect communications.

Figure 11:
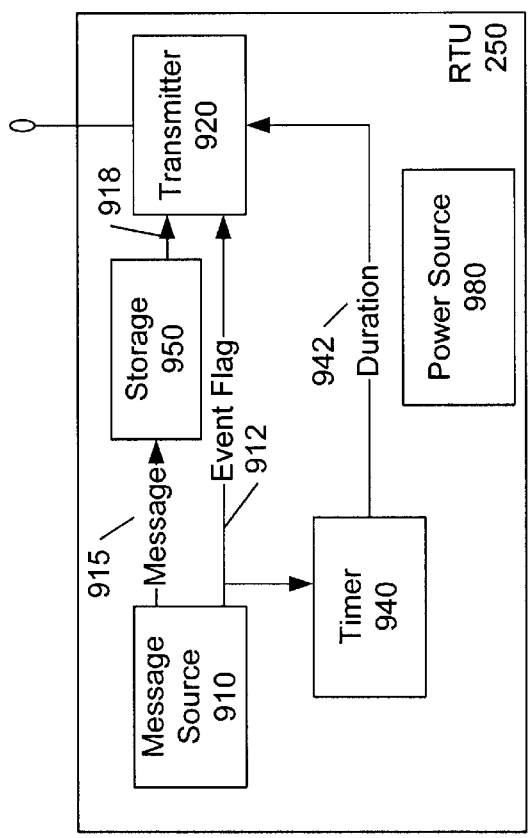
FIG. 11 illustrates a block diagram of the preferred embodiment of a remote terminal unit in accordance with an aspect of this invention.

In FIG. 11, the RTU 250 includes a message source 910, a storage element 950, a timer 940, and a transmitter 920. The message 915 from the message source 910 is stored in the storage element 950; this message is accessible as required by the transmitter 920 via 918. The message source 910 also generates an event flag 912. The event flag 912, for example, may be a flag that is asserted whenever consecutive measurements of a parameter differ by a specified amount, or whenever a parameter exceeds a particular value. The event flag 912 initiates the transmission of a transmission message 860 corresponding to the message 915 that is stored in storage element 950. The event flag 912 also activates the timer 940. The timer 940 is an interval timer that asserts a duration signal 942 coupled to the transmitter 920. In accordance with the preferred embodiment of this invention, the transmitter 920 repeatedly transmits the transmission message 860 corresponding to the stored message 915 while the duration signal 942 is asserted. Because the operation of the RTU 250 of FIG. 11 is independent of a trigger or synchronization signal from the satellite 200, the duration signal 942 must be asserted for a repetition duration 866 that will encompass the illumination period 850, as shown at line 9D of FIG. 9. In the embodiment depicted at line 9D, the repetition duration 866 exceeds the sweep period 800, thereby assuring that at least one illumination period 850 is included in the repetition duration 866. Also, the time duration 864 between the start of one transmission message 860 and the end of the next transmission message 860 is less than the illumination period 850, thereby assuring that at least one full transmission message 860 is contained within the illumination period 850. Thus, by providing for a store-and-retransmit capability at the RTU 250, the RTU 250 reliably and effectively communicates via a satellite 200 without requiring synchronization or coordination means between the RTU 250 and the satellite 200. In the preferred embodiment, the repetition duration 866 is kept to near minimum, to reduce power consumption by the RTU 250. The minimum repetition duration 866 is slightly less than the sweep period 800; in the preferred embodiment, the repetition duration 866 is between one and two sweep periods 800, to provide a sufficient margin of error.

Also shown in FIG. 11 is a power source 980. The power source 980 may be a conventional portable or fixed power supply, such as a battery or AC supply. Solar cells and other forms of power sources may be used as well. For example, in the triggered embodiment shown in FIG. 10, the receiver 930 can be a passive resonant circuit that is excited by the trigger signal 872 from the high-gain antenna 210. The energy induced into the resonant circuit by the transmitted trigger signal 872 can be used to subsequently activate and power the transmitter 920, similar to the concept used to induce the transmission of information from passive devices such as ID cards that are read from a distance.

Figure 12:
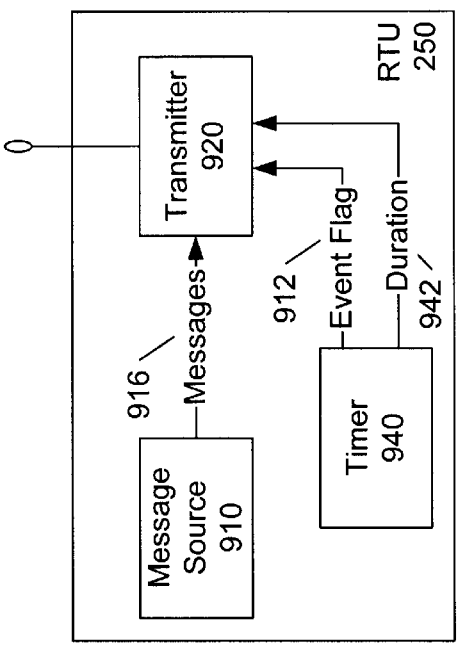
FIG. 12 illustrates a block diagram of another embodiment of a remote terminal unit in accordance with an aspect of this invention.

Other embodiments of an RTU 250 consistent with this invention will be evident to one of ordinary skill in the art. For example, FIG. 12 shows an alternative embodiment that uses the principles presented in the preferred embodiment of FIG. 11. In FIG. 12, the timer 940 generates both the duration signal 942, as well as the event flag 912. Such an embodiment would be used, for example, to generate periodic messages, rather than messages based on the source of the message. The message source 910 may be, for example, a Global Positioning System (GPS) receiver that generates the RTU's 250 global location coordinates. The timer 940 may generate an event flag every hour, thereby providing an hourly report of the RTUs 250 location, for the tracking of mobile RTUs 250, such as livestock or vehicles. Also, absent from FIG. 12 is a storage element 950. In this example embodiment, the transmitter 920 receives continual messages 916 from the message source 910, for example, continual coordinate locations, or continual soil moisture readings. Each of the "repeated" transmission messages 860 may contain different information, corresponding to the continual messages. In general, the differences among the transmission messages 860 are expected to be slight, such that the receipt of any one of the transmission messages 860 is sufficient to convey the desired periodic information.

Figure 13:
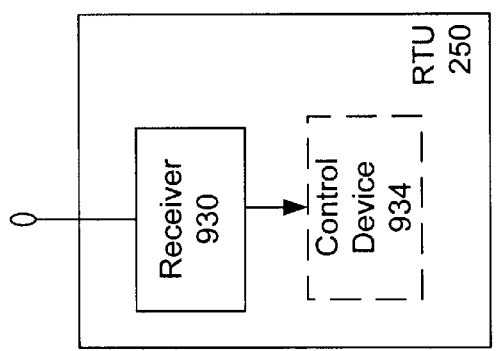
FIG. 13 illustrates a block diagram of an embodiment of a receive-only remote terminal unit in accordance with an aspect of this invention.
Figure 14:
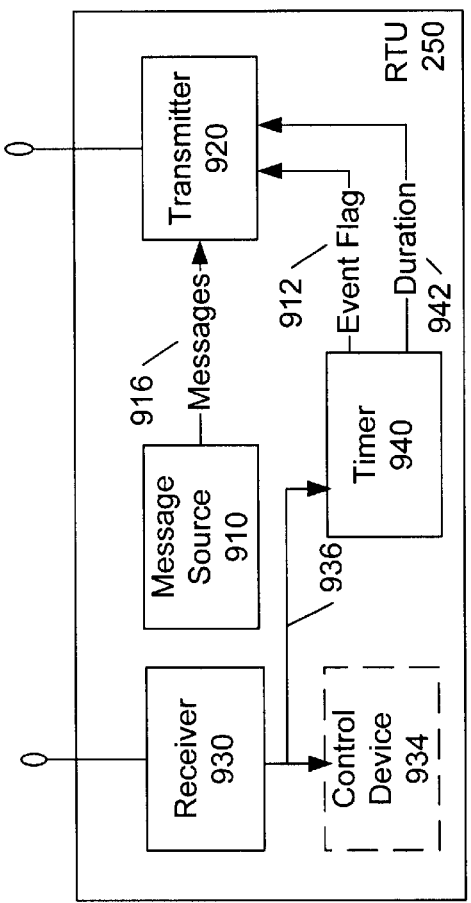
FIG. 14 illustrates a block diagram of an embodiment of a receive-transmit remote terminal unit in accordance with an aspect of this invention.

FIG. 13 shows an RTU 250 that includes a receiver 930 and an optional control device 934. The receiver 930 may be used to receive, for example, text or paging messages at a remote location. The optional control device 934 may be coupled to the receiver 930 for receiving control messages, for example to control a switch or a valve, or to sound an alarm. FIG. 14 is a composite of FIGS. 12 and 13, wherein the receiver 930 is operably coupled to the timer 940 that controls the transmitter 920. In this example embodiment, the duration signal 942 is asserted until a confirmation 936 is received that the information message 915 has been received at the satellite 200 or ground station 180.

Figure 15:
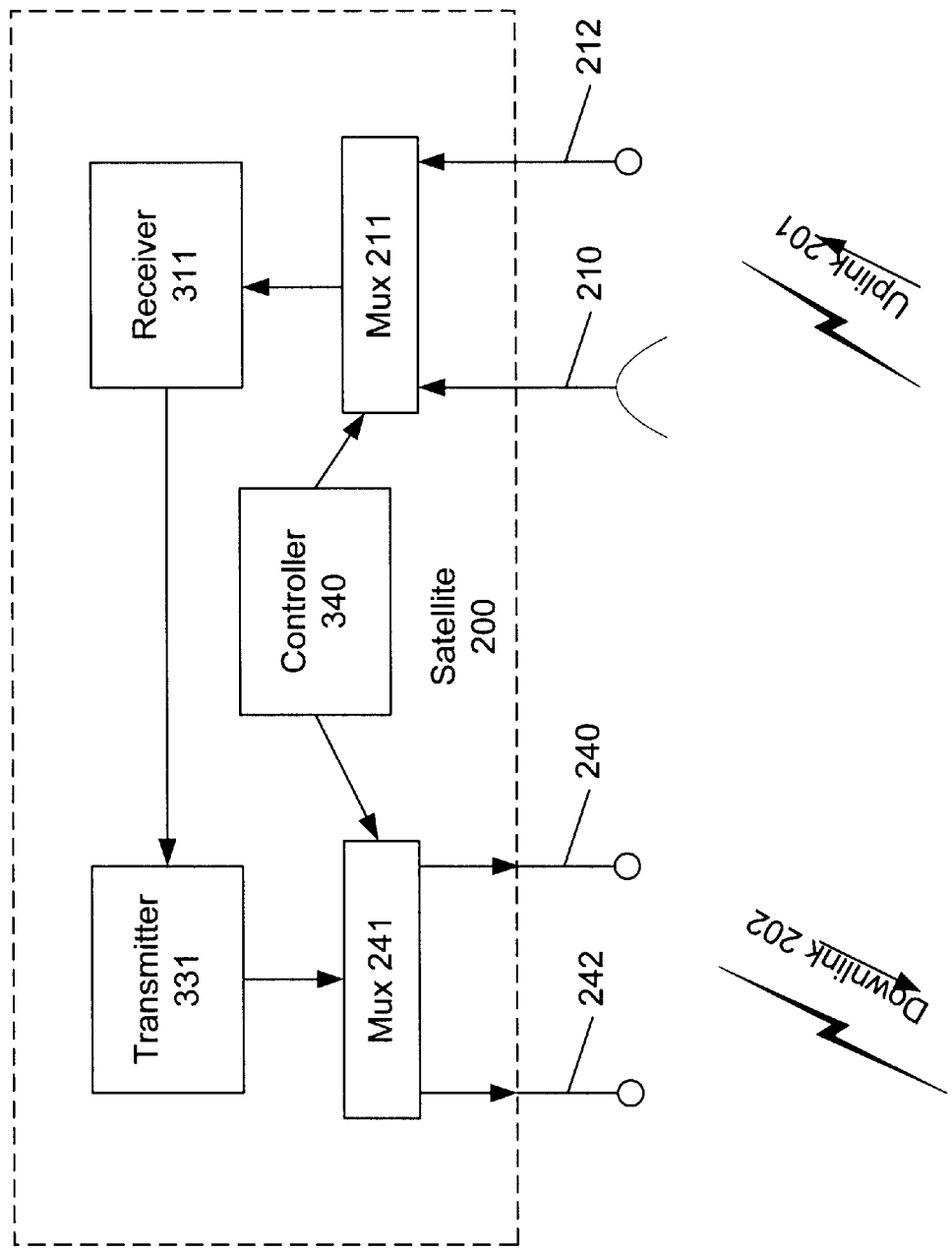
FIG. 15 illustrates a block diagram of an embodiment of a multiplexed satellite in accordance with an aspect of this invention.

An alternative configuration of the components of the satellite 200 shown in FIG. 6 is shown in FIG. 15. In FIG. 15, the two independent communication paths shown in FIG. 6 are reconfigured to use common equipment, such that the independence is maintained via a time-sharing of the equipment, rather than the use of duplicate equipment. That is, the receiver 310 and the uplink receiver 312 of FIG. 6 is the common receiver 311 of FIG. 15, with a time-division multiplexed switch 211 at its input. At one time interval, as determined by a controller 340, the receiver 311 receives communications from the RTUs 250 via the high gain antenna 210, and at another time interval, it receives communications from the ground station 280 via the uplink antenna 212. Similarly, the downlink antenna 240 and the wide-beamwidth antenna 242 are time-division multiplexed 241 at the output of a common transmitter 331. The common transmitter 331 of FIG. 15 corresponds to the transmitters 330 and 332 in FIG. 6. As would be evident to one of ordinary skill in the art, if the antennas 240 and 242 have similar gain requirements, the switch 241 and either one of the antennas 240 or 242 can be eliminated.

FIG. 9 shows an example of timing diagrams corresponding to the multiplexed embodiment of a satellite communication system shown in FIG. 14, at lines 9E and 9F. During the illumination sweep period 810, the receiver 311 is enabled 820 to receive communications from the RTUs 250; during the nonillumination period 815, the receiver 311 is enabled 825 to receive communications from the ground station 280. In this manner, the same receiver 311 is used to perform the function of the receivers 310 and 312, and the same frequency can be used for all uplink communications to the satellite. Similarly, the transmitter 331 is enabled 830 during the illumination sweep period 810 to transmit to the ground station 280, and the transmitter 331 is enabled 835 during the nonillumination period 815 to transmit to the RTUs 250, thereby allowing one transmitter and one frequency to be used for all downlink communications from the satellite.

In the preferred embodiments, the satellite 200 and RTUs 250 will be of minimal complexity, thus maximizing the satellite's reliability, and minimizing the RTUs 250 costs. The satellite 200 receives a radio frequency (RF) bandwidth of information at one frequency, and retransmits the same RF information bandwidth to the ground station 280 at a second frequency. All demodulation and decoding is preferably performed at the ground station 280. Similarly, all messages being sent to the RTUs 250 are encoded and modulated at the ground station 280 and transmitted to the satellite 200 at one frequency and retransmitted to the RTUs 250 at another frequency. As discussed with regard to lines 9E and 9F of FIG. 9, by multiplexing the function of the uplink receiver 311 and downlink transmitter 331, the bandwidth about one frequency, the uplink center frequency, can be used by either the RTUs 250 or the ground station 280 for transmission to the satellite 200, and the bandwidth about another frequency, the downlink center frequency, can be used by the satellite 200 to transmit to either the RTUs 250 or the ground station 280. For ease of discussion, this single uplink frequency and single downlink frequency model will be used hereinafter.

The bandwidth allocated for communicating the messages from the RTUs 250 to the ground station 280 must be sufficient to accommodate some maximum number of RTUs 250 communicating to the ground station 280 at the same time. This bandwidth is common to both the uplink and downlink paths to the satellite 200. Each RTU 250, however, does not require the entire bandwidth. The RTUs 250 can use any number of transmission modulation schemes to utilize the available bandwidth.

Figure 16:
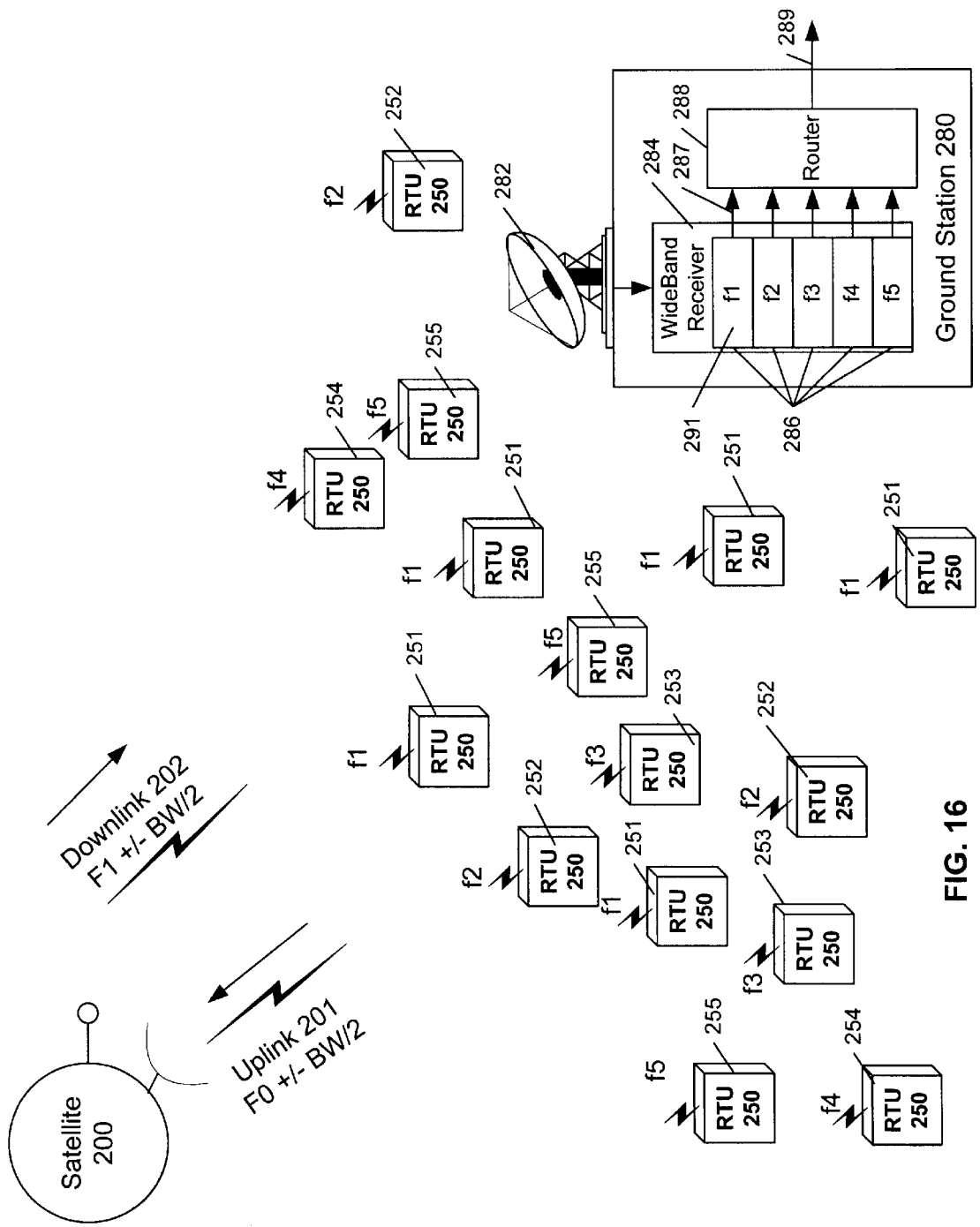
FIG. 16 illustrates a block diagram of an embodiment of a satellite communication system that uses FDM in accordance with an aspect of this invention.

FIG. 16 shows an embodiment of a satellite communications system that utilizes a frequency division allocation, or multiplexing (FDM), of the available bandwidth BW. The satellite 200 transforms an uplink signal 201, which is the RF information bandwidth centered about a frequency F0, into a downlink signal 202 that is the same RF information bandwidth centered about a different frequency F1. Shown in FIG. 16 is the use of five different frequencies f1, f2, ... f5 for communication from the RTUs 250 to the ground station 280 via the satellite 200. Each of the frequencies f1, f2, ... f5 lie within the RF information bandwidth BW centered about a frequency F0, that is, within the uplink signal 201. Each RTU 250 is allocated one of the five transmission frequencies. Those allocated to frequency f1 are identified as RTUs 251; those allocated to frequency f2 as 252; frequency f3 as 253; frequency f4 as 254; and frequency f5 as 255. The ground station 280 includes a wideband receiver 284, capable of receiving the downlink signal 202, which is the RF information bandwidth BW centered about F1, from the satellite 200. The wideband receiver 284 includes receiver components 286 that segregate the received bandwidth BW into segments corresponding to transmission frequencies f1, f2, ... f5. The receiver components 286 produce forwarding messages 287 that are processed by a router 288 and forwarded as destination messages 289, as will be discussed below.

In the embodiment of FIG. 16, each of the RTUs 251 transmit at frequency f1; these transmissions will be detected at 291, the receiver component 286 corresponding to frequency f1. If more than one RTU 251 transmits a transmission message that is received at the satellite 200 at the same time, the detected transmission at 291 will be, in general, a distorted combination of the received transmissions from each of the RTUs 251, and will be unusable. As noted above, however, the satellite communication system in accordance with this invention is preferably used for the communication of relatively short duration and infrequent information messages. Therefore, the likelihood of two RTUs 251 transmitting an information message at the same time is relatively low. Furthermore, the field of view 110 of the high-gain antenna 210 that is used to receive the transmission messages from the RTUs 251 is substantially smaller (at least half) the satellite service area 100. Therefore, assuming a somewhat random distribution of RTUs 251, the transmissions of at least half the RTUs 251 within the service area 100 will not be received by the satellite 200 at any given time, thereby reducing the likelihood of the simultaneous reception of signals from more than one RTU 251 at the same time. This same assessment of the likelihood of simultaneous receptions by the satellite 200 can be applied to transmissions from RTUs 252, 253, 254, and 255. As the bandwidth BW is increased, the number of transmission frequencies f1, f2, ... fn allocated among the RTUs 250 can be increased, thus further reducing the likelihood of a collision, i.e. the simultaneous reception of transmissions from more than one RTU 250 operating at the same frequency. As noted above, the preferred embodiment of the invention is intended for relatively low-priority messages, such that the loss of a message due to a collision is not catastrophic. As would be evident to one of ordinary skill in the art, however, if a particular RTU 250 is required to be collision free, the frequency assigned to that particular RTU 250 can be restricted, such that no other RTU 250 within the field of view 110 of the high-gain antenna 210 of the satellite 200 is allocated that same frequency. Similarly, unique frequencies may be assigned for transmissions to RTUs 250 that contain a receiver 930, so that the transmission of messages from other RTUs 250 in the vicinity of receiver 930 will not interfere with the reception of messages from the ground station 280.

Figure 17:
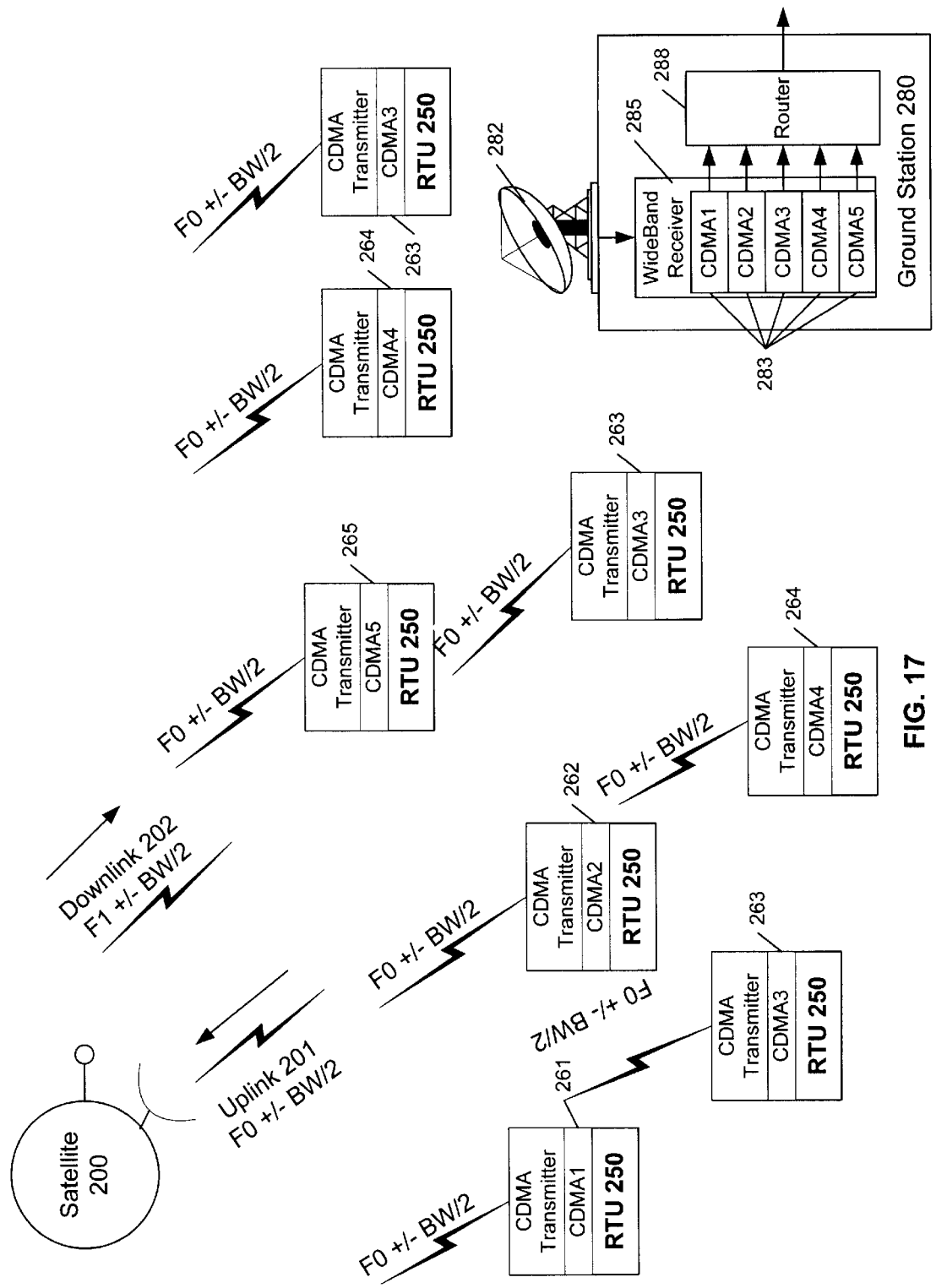
FIG. 17 illustrates a block diagram of an embodiment of a satellite communication system that uses CDMA in accordance with an aspect of this invention.

FIG. 17 shows an embodiment of a satellite communications system that uses a Code Division Multiple Access (CDMA) transmission modulation scheme. A CDMA modulation is a linear modulation of a carrier frequency in accordance with a particular CDMA code value, typically via a binary phase shift key (BPSK) or similar modulation, such as PAM, QPSK, OQPSK, and MSK. Each transition of the particular CDMA code value introduces a phase shift of the carrier signal. A correlator at the receiving end applies an inverse of the same CDMA code value to the received signal; if the decoded result shows a strong correlation to an unmodulated carrier signal, the correlator locks onto the received signal and produces the decoded result as an output. If a strong correlation is not found, for example, because the received signal was encoded using a different CDMA code, the received signal is ignored. CDMA codes that produce modulations that are each strongly uncorrelated with each other are termed orthogonal CDMA codes. The size, or length, of the CDMA codes are determined so as to spread the modulated carrier signal across the entire bandwidth BW. FIG. 17 shows the use of five orthogonal CDMA codes, CDMAI, CDMA2, ... CDMA5 in RTUs 250, identified as RTUs 261, 262, ... 263 respectively. The ground station 280 of FIG. 17 includes a wideband receiver 285 that includes CDMA correlators 287 that produce decoded outputs 287 corresponding to codes CDMA1, CDMA2, ... CDMA5. As in FIG. 16, the simultaneous reception of transmissions that use the same CDMA code will result in a collision. However, as contrast to FDM, once a correlator 287 locks onto a particular received signal, the occurrence of another received signal using the same CDMA code that starts at a later time is, in general, ignored in the same way that other uncorrelated signals are ignored. This is because once the correlator 287 locks onto a signal, it maintains a time-dependent correlated relationship with the signal, sequencing through each bit value of the CDMA code. That is, a second received transmission using the same CDMA code will be ignored, but it will not adversely affect the first received transmission. In effect, as compared to the FDM modulation scheme of FIG. 16, the likelihood of a lost message due to a collision in the CDMA modulation scheme of FIG. 17 is reduced by half.

Note however, that in the embodiments of FIG. 16 and FIG. 17, the RTUs 250 must be designed to have one of a fixed number of allocated frequencies or CDMA codes. To minimize the likelihood of collisions, RTUs 250 having the same allocated frequency or CDMA code should be uniformly distributed over the entire service area 100. In addition to the administrative overhead associated with allocating particular RTUs 250 to particular area, such an allocation may be impossible to enforce for mobile RTUs 250. Also, the allocation of resources at the ground station 280 is somewhat inefficient. If two RTUs 261 that use the same CDMA1 code are within the field of view 110 of the satellite 200 transmit coincidentally, one or both of the transmission messages will be lost due to a collision, even if no other RTUs 262, 263, 264, or 265 are transmitting. That is, the CDMA correlators 287 associated with CDMA codes CDMA2, CDMA3, CDMA4, and CDMA5 may be idle while messages transmitted with a CDMA1 code are being lost.

Figure 18:
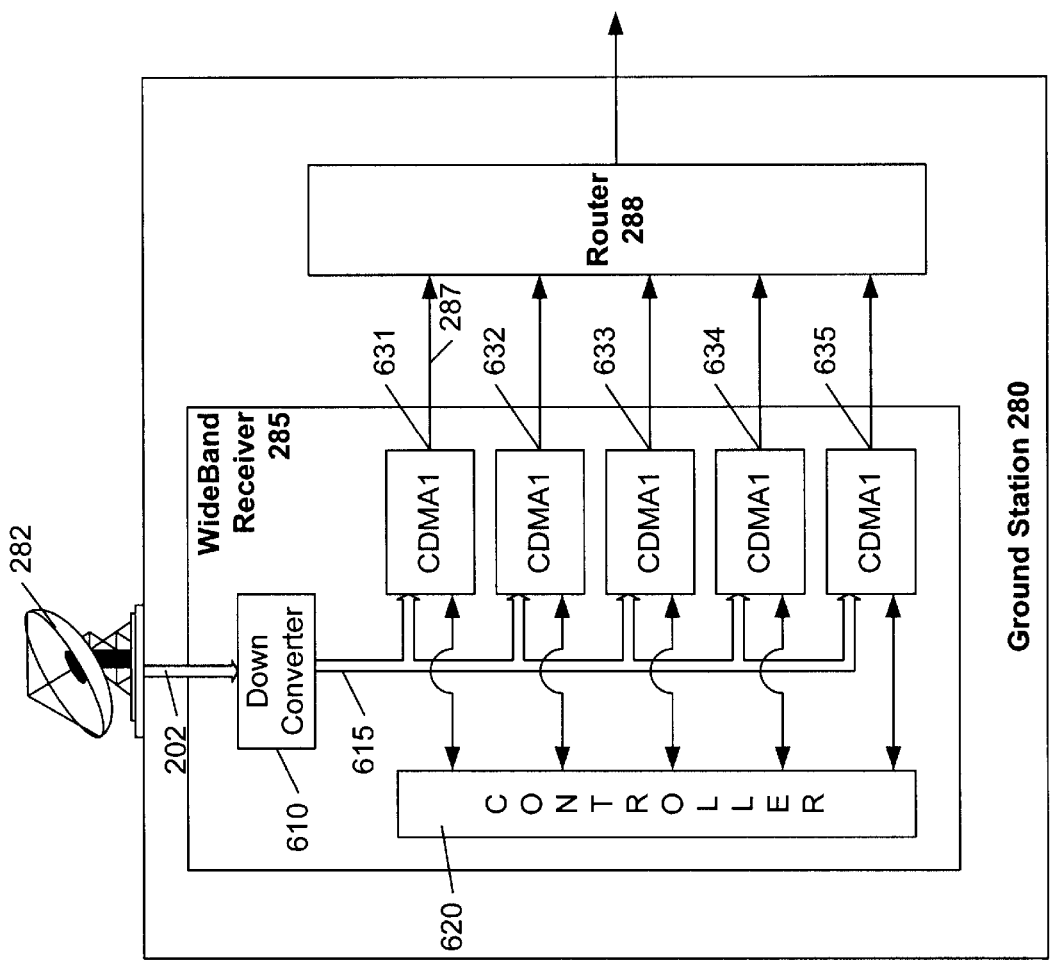
FIG. 18 illustrates a block diagram of an embodiment of a ground station that uses multiple CDMA correlators having the same CDMA code in accordance with an aspect of this invention.

FIG. 18 shows an embodiment of a ground station 280 that is optimized to reduce the likelihood of lost messages due to collisions. The ground station 280 is designed to provide communications to a plurality of RTUs 250 that use the same CDMA code; in this example, a plurality of RTUs 261 that use CDMA1. The wideband receiver 285 of the ground station 280 includes a down converter 610, a controller 620, and CDMA correlators 631 through 635 that use the same CDMA1 code to provide output signals 287. The controller 620 is operably coupled to each correlator 631–635, to provide a seek signal to each, and to receive a locked-on signal from each. The down-converter 610 extracts the RF information bandwidth BW from the downlink signal 202 to produce an intermediate signal 615. Initially, the controller 620 asserts the seek signal to correlator 631, and deasserts it to the other correlators 632–635. The seek signal instructs the selected correlator 631 to enter a seek mode, to search for a signal within the intermediate signal 615 that is strongly correlated to the CDMA1 code. When correlator 631 locks onto a received signal in the intermediate signal 615, it enters a locked-on mode, and notifies the controller 620. The controller 620 deasserts the seek signal to correlator 631, and asserts the seek signal to correlator 632. The correlator 631 proceeds to decode the correlated received signal, while the newly selected correlator 632 searches for another received signal that is correlated to the CDMA1 code. Because the correlator 632 is enabled for seeking after the start of the received signal that was detected by the correlator 631, the correlator 632 does not detect a strong correlation to this same received signal. When a second signal is received that is correlated to the CDMA1 code, the correlator 632 locks onto it and notifies the controller 620. Note that this receipt of a second correlated signal by correlator 632 is independent of whether the first correlated received signal is still being received and decoded by the correlator 631. Thereafter, the controller 620 deasserts the seek signal to the correlator 632 and asserts the seek signal to correlator 633, or to correlator 631 if correlator 631 deasserts its locked-on signal, indicating that the receipt of the first correlated signal has been completed. This process continues, such that the controller 620 enables each available correlator to seek until all correlators are unavailable because they are each receiving and decoding a received signal having a CDMA1 code. Thus, in this example embodiment, a message will not be lost because of a collision until all correlators are in use, thereby optimizing the use of resources within the ground station 280. In the preferred embodiment, each RTU 250 uses the same CDMA code. When the population density of RTUs 250 in a service area 100 increases to such an extent that collisions result in lost messages, the ground station need only be augmented to include additional correlators having this same CDMA code.

Figure 19:
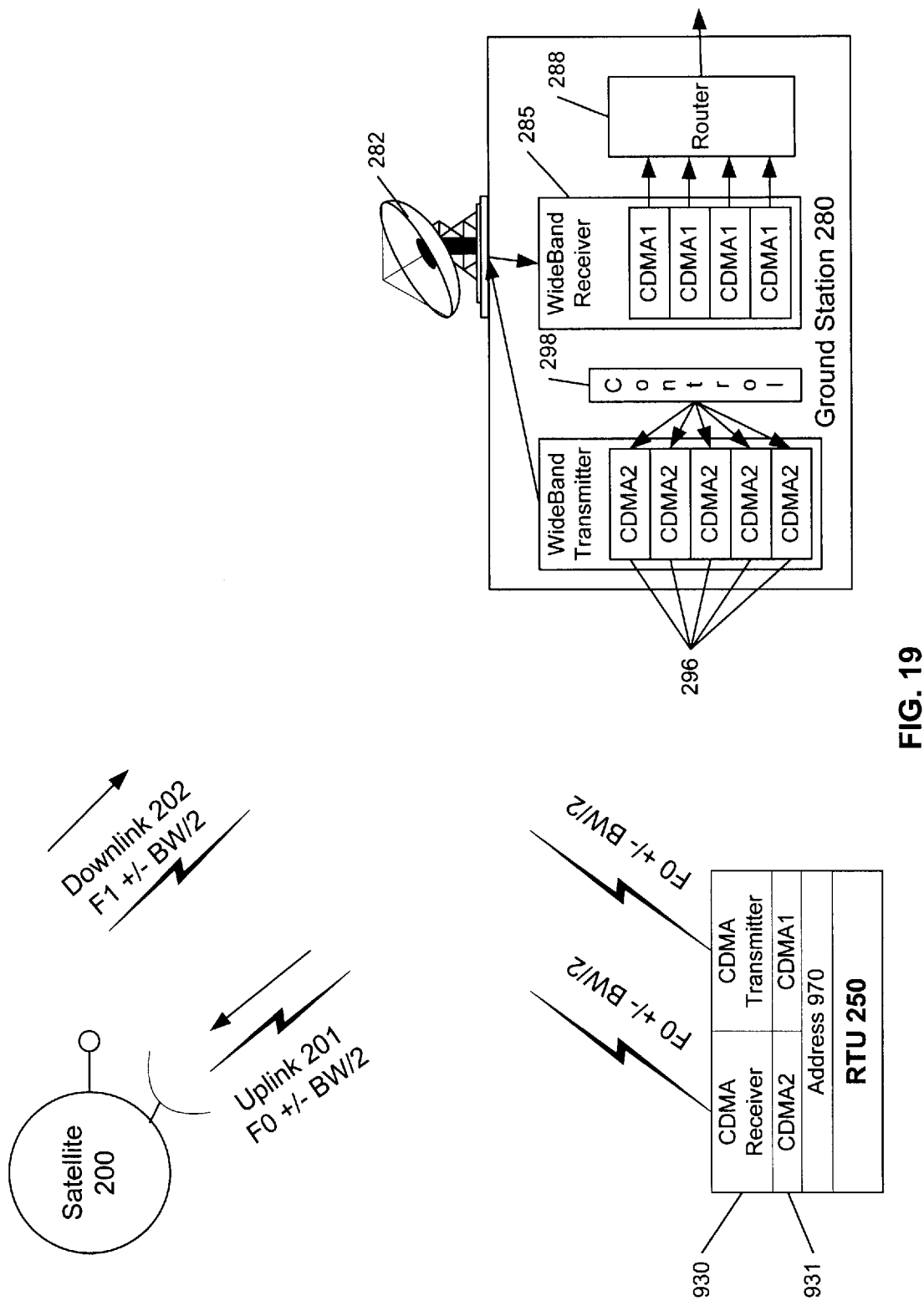
FIG. 19 illustrates a block diagram of an embodiment of a satellite communication system that uses CDMA for transmission and reception in accordance with an aspect of this invention.

FIG. 19 shows an embodiment of a satellite communication system that provides communications to and from the RTUs 250. Transmissions from the ground station 280 to the RTUs 250 that contain a receiver 930 use an orthogonal CDMA code to the RTUs 250 transmission CDMA code, to isolate each receiver 930 from interference from transmitting RTUs 250. As shown, in the preferred embodiment, the ground station 280 includes a wideband transmitter 290 that includes multiple CDMA modulators 296. In the preferred embodiment, each of the CDMA modulators 296 use the same CDMA code, shown as CDMA2 in FIG. 19. Using the same timeseparated use of the same CDMA code presented above, the controller 298 enables each CDMA modulator selectively, such that the modulations do not begin at exactly the same time, but multiple modulations can be occurring at the same time. Each message sent from the ground station 280 will contain a target address, identifying the address 970 associated with each RTU. Each RTU 250 having a receiver 930 will demodulate the messages being sent from the ground station 280 and process the messages that contain the RTUs address 970 as the target address. The RTU receiver 930 contains a correlator 931 that has a seek mode and a locked-on mode. The correlator 931 will remain in the seek mode until it locks onto a message from the ground station 280. If the message contains the address of the RTU 250 as its target address, the correlator 931 will remain locked onto the message until it ends. As soon as the message is determined not to contain the address of the RTU 250 as the target address, the correlator 931 reenters the seek mode. The controller 298 enables each CDMA modulator 296 after the transmission of the portion of the message that contains the target address. In this manner, each RTU 250 may use the same CDMA code for the reception of messages from the ground station 280, while still allowing the ground station 280 to transmit multiple messages at the same time.

The transmission messages 860 from each RTU may be conventional message packets, containing a source address, a destination address, and the information message 915 from the message source 910. The router 288 of the ground station 280, in FIGS. 16, 17, and 18 processes the received and decoded messages 287 and communicates the message to the location corresponding to the destination address, typically via conventional communication sources, such as telephone networks, internet, or other satellite systems.

Figure 20:
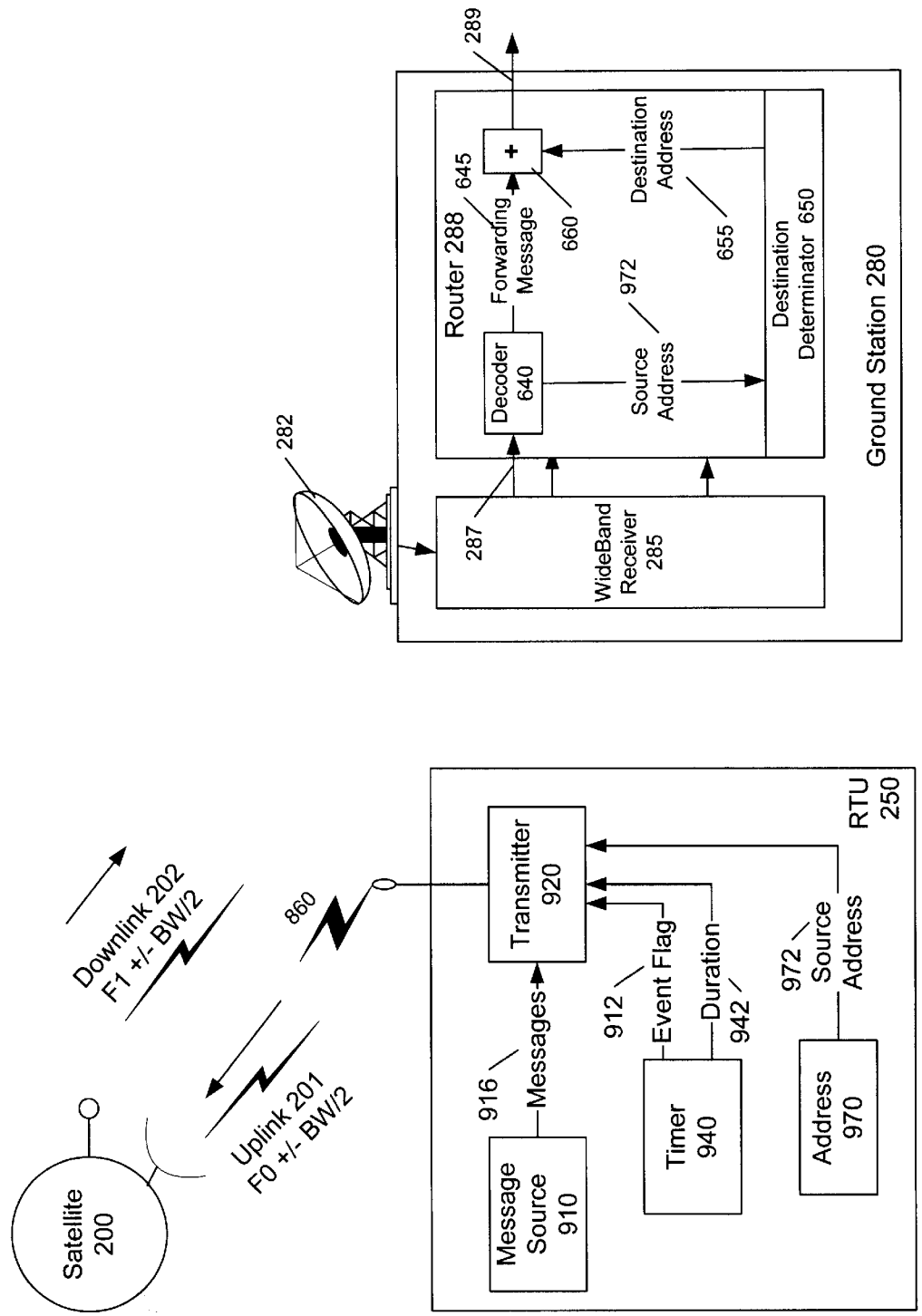
FIG. 20 illustrates a block diagram of an embodiment of an addressing scheme in accordance with an aspect of this invention.

In the preferred embodiment of the satellite communication systems, the transmission message 860 is optimized for the transmission of the information message 915 by the elimination of the destination address in the transmission message 860. As shown in an example embodiment of FIG. 20, the RTU 250 has an associated address 970 that is used as a source address 972 for inclusion in the transmission message 860, via the transmitter 920. In the example embodiment, each RTU 250 has an assigned destination address. That is, for example, each of the RTUs 250 attached to a herd of livestock would have a destination address that corresponds to the owner of the herd. Therefore, each message from the RTUs 250 that are attached to the herd need not explicitly contain the destination address. The router 288 of the ground station 280 in FIG. 20 includes a destination determinator 650 that determines the destination address 655 from the received source address 972. Each of the received messages 287 will be processed by a decoder 640 that extracts the source address 972 from the received message, and formulates a forwarding message 645. The destination determinator 650 receives the source address 972 and provides the destination address 655. The destination address 655 and the forwarding message 645 are combined at 660 to form the destination messages 289 for forwarding to the destination, as discussed above.

Figure 21:
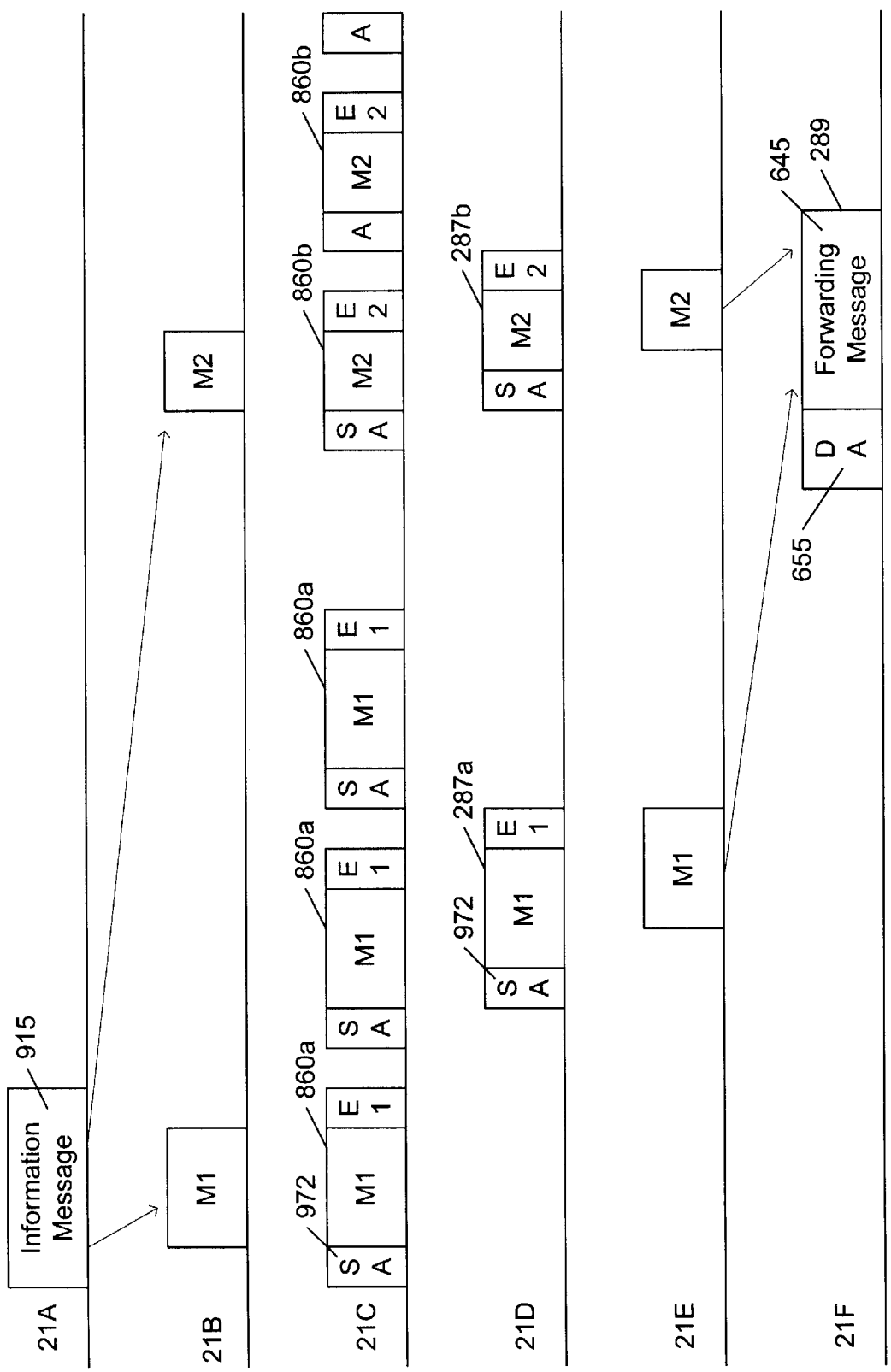
FIG. 21 illustrates a timing diagram of an embodiment of message processing in accordance with an aspect of this invention.

FIG. 21 shows a sample timing diagram for the transmission of information messages 915 to form destination messages 289. At line 21A, the information message 915 is shown. As discussed above, the transmission messages 860 are limited to the illumination period of the high-gain antenna 210 of the satellite 200. At line 21B, the information messages is shown to be decomposed into shorter messages M1 and M2, suitable for transmission as transmission messages 860a and 860b, on line 21C. The transmission messages 860a and 860b also contain segments E1 and E2 respectively, corresponding to protocol parameters, such as error detecting and/or correction codes, message sequence identifiers, message termination identifiers, and so on. These segments E1 and E2, for example, will contain the parameters necessary to inform the ground station 280 that messages M1 and M2 within transmission messages 860a and 860b should be used form a single forwarding message 645. The transmission messages 860a and 860b are repeatedly transmitted for a repetition period that is dependent upon the satellite sweep period, as discussed above. At the ground station 280, the wideband receiver 285 demodulates the downlink signal 202 to form the demodulated signals 287a and 287b, on line 21D. If multiple demodulated signals 287a or 287b are received, corresponding to the repetition of transmission messages 860a or 860b, the segment E1 or E2 of each is used to identify and eliminate multiple receptions. The decoder 640 extracts the messages M1 and M2 to form the forwarding message 645, at lines 21E and 21F. The decoder 640 also extracts the source address SA 972, forwards it to the destination determinator 650. The combiner 660 receives the corresponding destination address DA 655 and appends it to the forwarding message 645 to form the destination message 289, on line 21F.

As would be evident to one of ordinary skill in the art, the same principles can be applied to the transmission of messages from the ground station 280 to the RTUs 250. To optimize information transfer, for example, the source address of messages going to an RTU 250 need not be communicated to the RTU 250, if it is known that only one source, such as the owner of the RTU 250, may communicate to the RTU. The address 970 of the intended RTU 250 will be contained in the messages, or the address corresponding to a group of RTUs 250. The receiver 930 of each RTU 250 is configured to detect messages containing its individual address 970 or group messages corresponding to its address 970.

The foregoing merely illustrates the principles of the invention. It will thus be appreciated that those skilled in the art will be able to devise various arrangements which, although not explicitly described or shown herein, embody the principles of the invention and are thus within its spirit and scope.

We claim:

1. A communication system comprising:
   a plurality of remote terminal units, each including
      a transmitter that transmits a transmission message to a satellite having a service area and a high-gain antenna with a field of view that sweeps the service area during a sweep period, such that
         the transmitter is within the field of view for an illumination period that is substantially less than the sweep period and
         the transmission message has a message duration that is less than the illumination period; and,
   a ground station that receives retransmission messages corresponding to the transmission message of at least a first terminal unit of the plurality of remote terminal units when the transmitter of the first terminal unit is within the field of view.

2. The communication system of claim 1, wherein each transmitter of the plurality of remote terminal units has a fixed transmission modulation scheme.

3. The communication system of claim 2, wherein the fixed transmission modulation schemes of a substantial portion of the plurality of remote terminal units are substantially identical.

4. The communication system of claim 1, wherein
   the satellite receives an information bandwidth about a first frequency, the information bandwidth containing the transmission message of each of the plurality of remote terminal units that are within the field of view, and,
   the satellite transmits the information bandwidth about a second frequency, thereby forming the retransmission messages.

5. The communication system of claim 1, wherein the transmitter of the first terminal unit repeatedly sends the transmission message for a repeat duration that is based on the sweep period.

6. The communication system of claim 1, wherein
   the transmitter of the first terminal unit has an associated source address,
   the transmission message from the first terminal unit contains the associated source address, and
   the ground station formulates a forwarding message corresponding to the transmission message from the first terminal unit, for transmission to a destination address, the destination address being based on the associated source address.

7. The communication system of claim 1, wherein
   a frequency of a plurality of frequencies is allocated to each of the plurality of remote terminal units, and
   the transmitter of the each of the plurality of remote terminal units is configured to transmit at the frequency allocated to the each of the plurality of remote terminal units.

8. The communication system of claim 1, wherein
   a CDMA code of a plurality of CDMA codes is allocated to each of the plurality of remote terminal units, and
   the transmitter of each of the plurality of remote terminal units is configured to transmit in accordance with the CDMA code allocated to the each of the plurality of remote terminal units.

9. The communication system of claim 1, wherein:
   the transmitter of the first terminal unit is configured to transmit in accordance with a predetermined CDMA code, and
   the transmitter of a second terminal unit of the plurality of remote terminal units is configured to transmit in accordance with the predetermined CDMA code.

10. The communication system of claim 9, wherein each of the plurality of remote terminal units is configured to transmit in accordance with the predetermined CDMA code.

11. The communication system of claim 1, wherein each remote terminal unit also includes
   a message source, operably coupled to the transmitter, that produces an information message, and wherein
   the transmitter produces the transmission message based upon at least a portion of the information message.

12. The communication system of claim 1, wherein
   the transmitter produces a plurality of intermediate messages corresponding to an information message, and
   each of the plurality of intermediate messages forms the transmission message.

13. The communication system of claim 1, wherein
   the transmission message of each of the plurality of remote terminal units includes an error correction code.

14. The communication system of claim 1, wherein each of the plurality of remote terminal units also includes
   a wide beamwidth antenna, operably coupled to the transmitter, that facilitates transmission of the transmission message to the satellite.

15. The communication system of claim 1, wherein each of a plurality of receiving units of the plurality of remote terminal units also includes
a receiver that receives control messages that are transmitted from the ground station.

16. The communication system of claim 15, wherein the receiver of each of the plurality of receiving units includes
a CDMA correlator that demodulates the control messages in dependence upon a predetermined CDMA code associated with the each of the plurality of receiving units.

17. The communication system of claim 16, wherein the receiver of the each of the plurality of receiving units includes
a controller, operably coupled to the CDMA correlator, that controls the CDMA correlator in dependence upon a portion of the control messages.

18. The communication system of claim 15, wherein the control messages are transmitted from the ground station during a first time interval, and the retransmission messages are received by the ground station during a second time interval.

19. A communication device comprising:
a message source that generates an information message, and
a transmitter that communicates via a satellite having a service area and a high-gain antenna with a field of view that sweeps the service area during a sweep period and an illumination period that is substantially less than the sweep period, wherein
the transmitter generates at least one transmission message that is based on the information message and has a message duration that is less than the illumination period, and
the transmitter repeatedly transmits the at least one transmission message for a repeat duration that is based on the sweep period.

20. The communication device of claim 19, further including a hemispheric antenna operably coupled to the transmitter.

21. The communication device of claim 19, further including a portable power source operably coupled to provide power to the transmitter.

22. The communication device of claim 19, further including a solar power device operably coupled to provide power to the transmitter.

23. The communication device of claim 19, further including a resonant power device operably coupled to provide power to the transmitter.

24. The communication device of claim 19, further including a receiver that receives communications via the satellite.

25. The communication device of claim 24, further including a control device operably coupled to the receiver and responsive to the communications received via the satellite.

26. The communication device of claim 19, wherein the sweep period is less than an orbital period of the satellite.

27. The communication device of claim 19, wherein the transmitter transmits the at least one transmission message to the satellite with not more than one watt of power.

28. The communication device of claim 19, wherein the information message includes a location coordinate of the message source.

29. The communication device of claim 19, further including a timer for facilitating periodic transmissions.

30. The communication device of claim 19, wherein the transmitter also includes a CDMA modulator that produces the at least one transmission message based on a predetermined CDMA code.

31. A communication system comprising:
a ground station that receives an information bandwidth that includes a plurality of transmission messages, the ground station including:
a plurality of CDMA correlators for demodulating at least two of the plurality of transmission messages based on a predetermined CDMA code, each correlator of the plurality of CDMA correlators using the predetermined CDMA code and each correlator having a seek mode and a locked-on mode, and
a controller that selectively controls a first correlator of the plurality of CDMA correlators to enter the seek mode when a second correlator of the plurality of CDMA correlators enters the locked-on mode.

32. The communication system of claim 31, wherein each of the plurality of transmission messages includes a source address that identifies one of a plurality of remote terminal units, and the ground station includes a destination determinator that determines a destination address based on the source address.

33. The communication system of claim 31, wherein the ground station also includes a router that forwards a demodulated message from each correlator of the plurality of correlators to a destination.

34. The communication system of claim 31, also including:
a plurality of remote terminal units, each of the remote terminal units including a transmitter for transmitting an each of the plurality of transmission messages based on the predetermined CDMA code.

35. The communication system of claim 34, wherein transmissions from the remote terminal units to the ground station are via a satellite having a high-gain antenna with a field of view that sweeps a service area of the satellite.

36. A communication system comprising:
a ground station that transmits an RF bandwidth that includes a plurality of messages, the ground station including:
a plurality of CDMA modulators that modulate at least two of the plurality of messages based on a predetermined CDMA code, each modulator of the plurality of CDMA modulators using the predetermined CDMA code,
a controller that selectively controls each of the plurality of CDMA modulators based on a target address contained in each of the plurality of messages.

37. The communication system of claim 36, wherein transmissions from the ground station to the remote terminal are via a satellite.

* * * * *